(12) United States Patent  (10) Patent No.: US 7,839,535 B2
Moriya et al.  (45) Date of Patent: Nov. 23, 2010

(54) PRINTING DEVICE THAT PERFORMS IMAGE PROCESSING ON IMAGE DATA, PRINTING METHOD, AND COMPUTER PROGRAM PRODUCT

(75) Inventors: Hidekuni Moriya, Suwa (JP); Nobutaka Sasazawa, Kagoshima (JP); Masanori Ishida, Kagoshima (JP); Keiko Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 11/899,807

(22) Filed: Sep. 7, 2007

(65) Prior Publication Data

US 2008/0062481 A1 Mar. 13, 2008

(30) Foreign Application Priority Data

Sep. 12, 2006 (JP) ............................. 2006-246928
Jul. 19, 2007 (JP) ............................. 2007-188234

(51) Int. Cl.
*G06K 15/00* (2006.01)
*G06K 15/02* (2006.01)
*H04N 1/60* (2006.01)
*H04N 1/46* (2006.01)

(52) U.S. Cl. ........................ 358/1.18; 358/1.9; 358/537; 358/1.2

(58) Field of Classification Search ........................ None
See application file for complete search history.

(56) References Cited

FOREIGN PATENT DOCUMENTS

JP 08-317237 11/1996
JP 11-088672 3/1999

OTHER PUBLICATIONS

Abstract of Japanese Patent Publication No. 08-317237, Pub. Date: Nov. 29, 1996, Patent Abstracts of Japan.
Abstract of Japanese Patent Publication No. 11-088672, Pub. Date: Mar. 30, 1999, Patent Abstracts of Japan.

*Primary Examiner*—Twyler L Haskins
*Assistant Examiner*—Barbara D Reinier
(74) *Attorney, Agent, or Firm*—Martine Penilla & Gencarella, LLP

(57) ABSTRACT

A printing device comprising: a data acquiring unit configured to acquire image data; an image processing unit configured to generate display image data and printing image data based on the image data by with pixel value of a pixel at a first position in an image of the printing image data, performing an image process of modifying a pixel value of a first subject pixel of the printing image data at the first position or another position, the first position being determined according to a first parameter P1, with pixel value of a pixel at a second position in an image of the display image data, performing an image process of modifying a pixel value of a second subject pixel of the display image data at the second position or another position, the second position being determined according to a second parameter P2, and determining the second parameter P2 such that a ratio (P2/P1) of the second parameter P2 and the first parameter P1 is in a specified range that includes a ratio (Px2/Px1) of a display pixel count Px2 representing a size of the image of the display image data and a printing pixel count Px1 representing a size of the image of the printing image data; a display unit configured to display an image based on the display image data; and a printing unit configured to perform printing based on the printing image data.

5 Claims, 16 Drawing Sheets

Fig.10

| USER SETTING | SUBJECT | ADAPTIVE COEFFICIENT | RADIUS | THRESHOLD VALUE |
|---|---|---|---|---|
| SHARP-NESS STRONG | PRINTING (1800pixel, 360ppi) | 100% | 2.0 | 5 |
| | DISPLAY (360pixel, 112.5ppi) | 100% | 0.5 (Rr1=0.25) | 5 |
| SHARP-NESS WEAK | PRINTING (1800pixel, 360ppi) | 50% | 0.6 | 10 |
| | DISPLAY (360pixel, 112.5ppi) | 50% | 0.2 (Rr2=0.33) | 10 |

Fig.11

| USER SETTING | IMAGE DATA ANALYSIS RESULTS | SUBJECT | ADAPTIVE COEFFICIENT | RADIUS | THRESHOLD VALUE |
|---|---|---|---|---|---|
| SHARP-NESS STRONG | FIRST IMAGE TYPE (FEW CLEAR CONTOUR LINES) | PRINTING (1800pixel, 360ppi) | 50% | 2.0 | 5 |
| | | DISPLAY (360pixel, 112.5ppi) | 50% | 0.6 (Rr11=0.3) | 5 |
| | SECOND IMAGE TYPE (MANY CLEAR CONTOUR LINES) | PRINTING (1800pixel, 360ppi) | 200% | 2.0 | 5 |
| | | DISPLAY (360pixel, 112.5ppi) | 200% | 0.5 (Rr12=0.25) | 5 |
| SHARP-NESS WEAK | FIRST IMAGE TYPE (FEW CLEAR CONTOUR LINES) | PRINTING (1800pixel, 360ppi) | 20% | 0.5 | 10 |
| | | DISPLAY (360pixel, 112.5ppi) | 20% | 0.2 (Rr21=0.4) | 10 |
| | SECOND IMAGE TYPE (MANY CLEAR CONTOUR LINES) | PRINTING (1800pixel, 360ppi) | 100% | 0.5 | 10 |
| | | DISPLAY (360pixel, 112.5ppi) | 100% | 0.15 (Rr22=0.3) | 10 |

PRINTING DEVICE THAT PERFORMS IMAGE PROCESSING ON IMAGE DATA, PRINTING METHOD, AND COMPUTER PROGRAM PRODUCT

BACKGROUND

1. Technical Field

This invention relates to technology for printing with performing image processing on image data.

2. Related Art

There is technology that performs the kind of processing described below when printing images. With that technology, simultaneous with the processing of image data by the user, the image data after processing is displayed on the display panel. Then, after the user confirms the processing results with the display of the display panel, the image is recorded on recording paper.

However, there was no consideration of the problem that the impression received from printed matter generated based on image data after processing and the impression received from the display of the display unit of a display panel based on the image data are different.

An advantage of some aspects of the invention is that it was created to handle at least part of the problems noted above, and when performing printing with performing image processing on image data, it displays on the display unit an image with an impression close to that of the impression the user receives from the printing results.

The entire disclosure of Japanese patent applications No. 2006-246928 and 2007-188234 of SEIKO EPSON is hereby incorporated by reference into this document.

SUMMARY

To address at least one of the above mentioned problems, some procedures are performed with a printing device as an aspect of the invention. The printing device has: a data acquiring unit configured to acquire image data; an image processing unit configured to generate display image data and printing image data based on the image data; a display unit configured to display an image based on the display image data; and a printing unit configured to perform printing based on the printing image data. Note that with this specification, "printing device" indicates a printer in a narrow sense, but in a broader sense it represents an overall printing system that includes a printing device and other device that provides printing data to the printing device.

An image processing is performed on the printing image data according to a first parameter P1. The image processing is to be performed based on a positional relationship between pixels in an image. The image processing is performed on the display image data according to a second parameter P2. Before the image processing on the display image data, the second parameter P2 is determined based on the first parameter P1, the printing pixel count Px1 which is a pixel count of the printing image data, and a display pixel count Px2 which is a pixel count of the display image data.

With this kind of aspect, compared to an aspect for which image processing is performed on display image data according to a parameter of the same value as the value of the parameter of the image processing performed on the printing image data, it is possible to display on the display unit an image that receives an impression close to the impression received by the user from the printing results.

The following kind of aspect is also possible with the invention, for example. Using pixel value of a pixel at a first position in an image of the printing image data, an image process is performed. The image process is an image process of modifying a pixel value of a first subject pixel of the printing image data at the first position or another position. The first position is to be determined according to a first parameter P1. Using pixel value of a pixel at a second position in an image of the display image data, another image process is performed. The image process is an image process of modifying a pixel value of a second subject pixel of the display image data at the second position or another position. The second position is to be determined according to a second parameter P2. The second parameter P2 is determined such that a ratio (P2/P1) of the second parameter P2 and the first parameter P1 is in a specified range that includes a ratio (Px2/Px1). The display pixel count Px2 represents a size of the image of the display image data. The printing pixel count Px1 represents a size of the image of the printing image data.

With this kind of aspect, the second parameter P2 used for image processing of the display image data is determined considering the difference between the printing pixel count Px1 and the display pixel count Px2. Because of this, when performing printing by performing image processing in the image data, it is possible to display on the display unit an image receiving an impression close to the impression the user receives from the printing results.

Note that the first and second position can be set to be absolute positions in the respective image data. Also, the first and second positions can be set to be relative positions in relation to the respective first and second subject pixels.

The image processing unit may preferably determine the second parameter P2 such that the ratio (P2/P1) of the second parameter P2 and the first parameter P1 is greater than the ratio (Px2/Px1) of the display pixel count Px2 and the printing pixel count Px1.

The impression received by the user from the display of the display unit has a tendency to have more accentuated screen roughness and contour lines than the impression received from the printing results. Thus, with an aspect such as that noted above, it is possible to display on the display unit an image that receives an impression closer to the impression received by the user from the printing results. Note that when the size of the image displayed on the display unit is smaller than the size of the printed image, the aforementioned aspect is more effective. Also, when the display unit is an item that displays color using light emission, the aforementioned aspect is more effective.

The first position may be a first relative position relative to the first subject pixel. The second position may be a second relative position relative to the second subject pixel. The pixel value of the first subject pixel may be modified using pixel values of one or more pixels in the first relative position relative to the first subject pixel. The pixel value of the second subject pixel may be modified using pixel values of one or more pixels in the second relative position relative to the second subject pixel.

With this kind of aspect, when executing printing by performing processing on the image such as sharpness, soft focus or the like, it is possible to display on the display unit an image that receives an impression close to the impression received by the user from the printing results.

Note that the first parameter P1 can be made to be a parameter representing the maximum value of the distance between the pixel in the first relative position and the first subject pixel. Then, the second parameter P2 can be made to be a parameter representing the maximum value of the distance between the pixel in the second relative position and the second subject pixel.

Meanwhile, it is also possible to have an aspect whereby with the image processing, the pixel value of the subject pixel is modified using the weighted average value of the pixel value of one or more pixels in a specified relative position in relation to the subject pixel. With that kind of aspect, it is possible to make the first and second parameters P1 and P2 be parameters representing the half value width of the weight.

It is preferable that a type of an image of the image data is determined from among a plurality of types of images including a first type of image and a second type of image which includes clear contours more than the first type of image. In such an aspect, the second parameter P2 may be determined such that when the image of the image data is the second type of image, (P2/P1) is smaller than when the image of the image data is the first type of image.

When the image has many clear contours, compared to when the image has few clear contours, it is easier to notice the contours when displayed on the display unit. Thus, with the kind of aspect noted above, when executing printing by performing processing on the image such as sharpness, soft focus or the like, it is possible to display on the display unit an image that receives an impression close to the impression received by the user from the printing results.

The first position may be pixel positions having a mutual fixed gap determined according to the first parameter P1 along a specified direction for the image of the printing image data. The first subject pixel may be a pixel in the first position. The second position may be pixel positions having a mutual fixed gap determined according to the second parameter P2 along a specified direction for the image of the display image data. The second subject pixel may be a pixel in the second position.

In such an aspect, the pixel value of each of the first subject pixels may be modified by applying a same coefficient to the pixel values of a plurality of the first subject pixel. The pixel value of each of the second subject pixels may be modified by applying a same coefficient to the pixel values of a plurality of the second subject pixel.

With this kind of aspect, when performing printing with adding of a texture such as matte or matt or the like to the image, it is possible to display on the display unit an image that receives an impression close to the impression received by the user from the printing results.

A face area including a human face may be determined for the image of the display image data and the image of the printing image data. The first position may be a position aligned with the first subject pixel along a direction perpendicular to a predetermined first reference line within the face area. The second position may be a position aligned with the second subject pixel along a direction perpendicular to a predetermined second reference line within the face area.

With this kind of aspect, for example, if the first and second reference lines are face center lines, when executing printing by performing the process of making the jaw line thinner or thicker, it is possible to display on the display unit an image that receives an impression close to the impression received by the user from the printing results. Also, for example, if the first and second reference lines are the vertical direction center lines of the eyes, when executing printing by performing processing of making the size of the eyes of the person's face larger or smaller, it is possible to display on the display unit an image that receives an impression close to the impression received by the user from the printing results.

When determining the second parameter P2, it is preferable that the second parameter P2 is determined based on a size of the image to be printed. With this kind of aspect, it is possible to change the contents of the image processing performed on printing image data and the image processing performed on the display image data according to the image resolution. As a result, it is possible to display on the display unit an image that receives an impression close to the impression received by the user from the printing results. Note that furthermore, it is preferable to determine the second parameter P2 based on the size of the image displayed on the display unit.

The printing device may further have an input unit configured to receive input of instruction relating to the first parameter P1 from a user. In such an aspect, it is preferable that the first and second parameters P1 and P2 are determined according to the instructions from the user.

Note that the invention can be realized with various aspects, for example it can be realized with aspects such as a printing method and printing device, a printing control method and printing control device, a computer program for realizing the functions of those methods or devices, a recording medium for recording that computer program, data signals manifested inside carrier waves that contain that computer program, and the like.

These and other objects, features, aspects, and advantages of the present invention will become more apparent from the following detailed description of the preferred embodiments with the accompanying drawings.

BRIEF DESCRIPTION OF THE DRAWINGS

FIG. 10 is a chart showing the relationship between the smoothing process radius as the display correction parameter and the smoothing process radius as the printing correction parameter;

FIG. 11 is a chart showing the relationship between the smoothing process radius as the display correction parameter and the smoothing process radius as the printing correction parameter;

FIGS. 13A and 3B show the contents of the process of making the jaw line thinner of the enhancement process;

DESCRIPTION OF EXEMPLARY EMBODIMENT

A. First Embodiment

Figure 1:
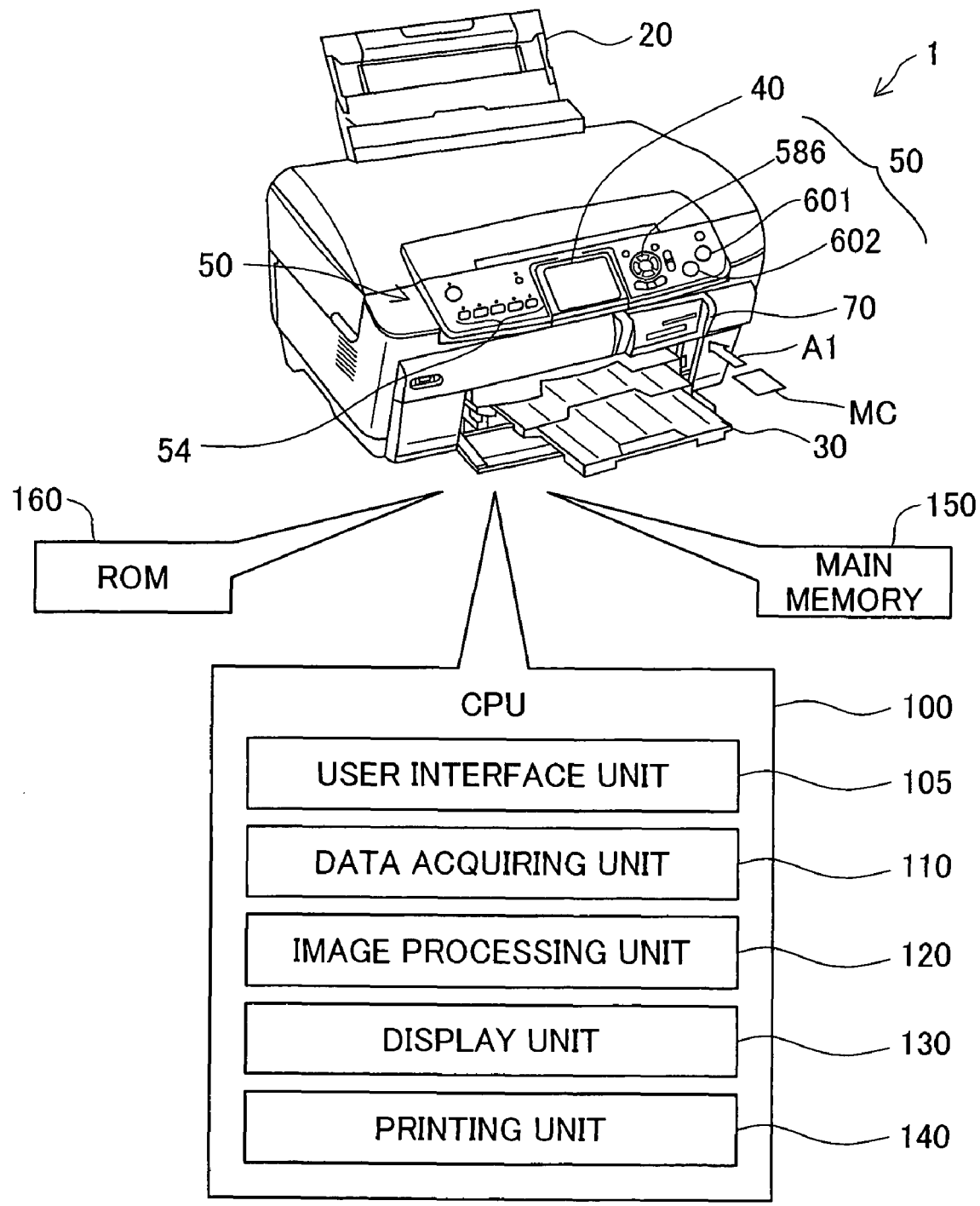
FIG. 1 is a perspective view showing the printer 1 which is an embodiment of the invention.

FIG. 1 is a perspective view showing a printer 1 which is an embodiment of the invention. The printer 1 is a printer that is able to perform printing independently based on image data files stored in a recording medium without being connected to an external computer.

This printer 1 is equipped with a printing head (not illustrated) that sprays ink drops to perform printing, an auto sheet feeder 20 for supplying printing paper, a paper output tray 30 for receiving printing paper on which an image is printed, a liquid crystal display 40, a button group 50 for performing various operations, a card slot 70 for inserting a memory card and reading data, a CPU 100, a main memory 150, and a ROM 160. Note that in FIG. 1, to make the description easier to understand, the CPU 100, the main memory 160, and the ROM 160 are displayed outside the printer 1.

The card slot 70 can have a memory card MC such as a compact flash (trademark) card, an SD card, a mini SD card, a memory stick, a smart media card or the like inserted directly in the slot, or inserted via an adapter (see arrow A1 in FIG. 1). Then, the CPU 100 is able to fetch a plurality of image data files stored in those memory cards MC via the card slot 70.

Figure 2:
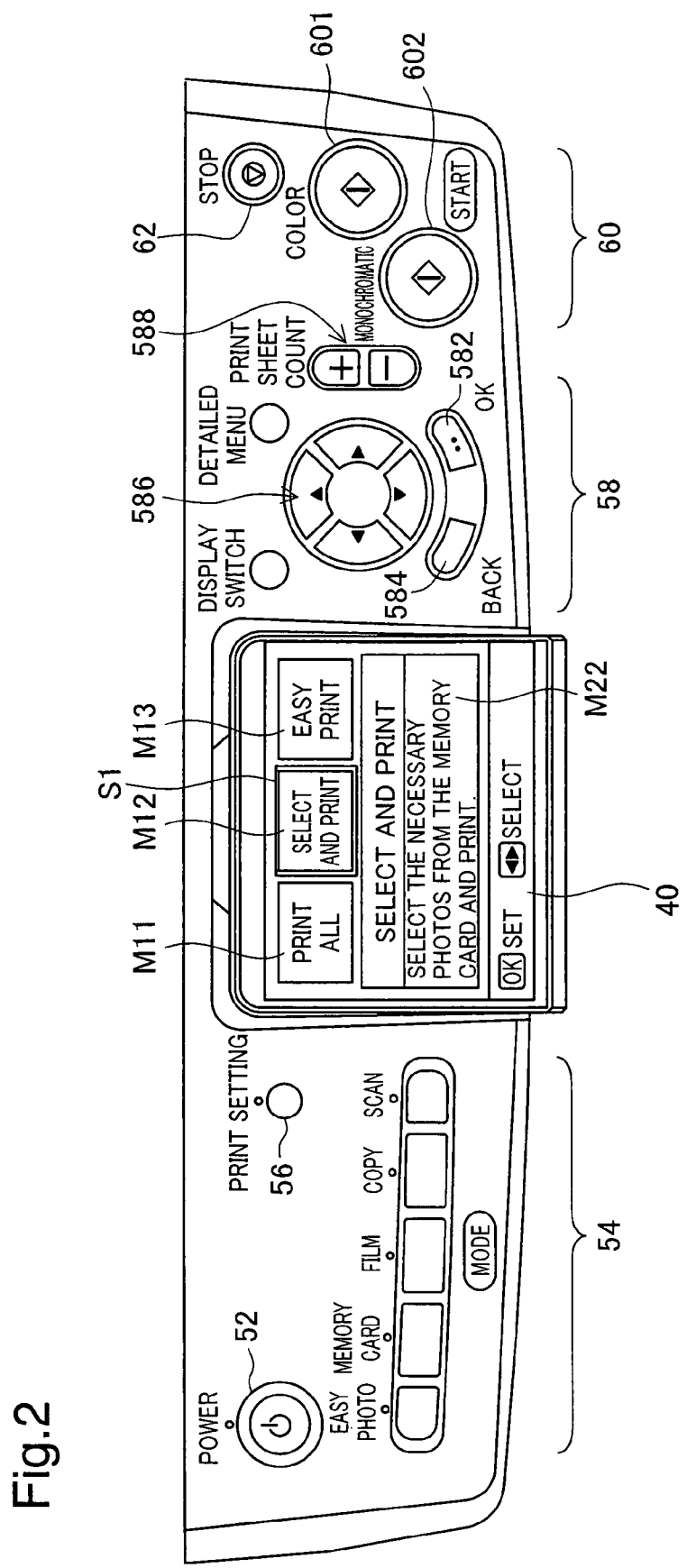
FIG. 2 is an enlarged plan view showing the operating panel on which are provided the liquid crystal display 40 and the button group 50.

FIG. 2 is an expanded plan view showing an operating panel on which the liquid crystal display 40 and the button group 50 are provided. Provided at the center of the operating panel is a 4 inch size (vertical 2.4 inch×horizontal 3.2 inch) liquid crystal display 40. The liquid crystal display 40 can display maximum 270 pixel×360 pixel color images. The liquid crystal display 40 can display images of image data files stored in the memory card MC, for example. The liquid crystal display 40 can also display information indicating the printer 1 status, or an operation menu used when the user inputs instructions to the printer 1 via the button group 50, for example.

A user interface unit 105 as the function unit of the CPU 100 is shown in FIG. 1. The user interface unit 105 displays a user interface screen on the liquid crystal display 40 to prompt input of instructions by the user, and receives instructions from the user via the button group 50.

Provided at both sides of the liquid crystal display 40 are buttons 52 through 62 for performing various operations. These are consolidated to be called button group 50. The power button 52 is a button for turning the power of the printer 1 on or off. The mode button group 54 is a plurality of buttons for the user to switch the printer operating mode. One button corresponds to one operating mode. The print setting button 56 is a button pressed when performing various types of maintenance of the printer 1 or the operating settings of each mode.

The menu button group 58 is a plurality of buttons for operating each type of numerical value or icon displayed on the liquid crystal display 40. The start button group 60 is two buttons 601 and 602 for selecting whether to perform color printing or to perform monochromatic printing. One button corresponds to each of the color printing and the monochromatic printing. The stop button 62 is a button for stopping the operation being executed by the printer 1.

The menu button group 58 includes an OK button 582 for performing input to the effect that the setting contents presented on the liquid crystal display 40 are acknowledged, a back button 584 for displaying the contents displayed one step before on the liquid crystal display 40, a selection button group 586 consisting of four buttons for selecting one from among a plurality of icons or menus displayed on the liquid crystal display 40, and a print copy count button group 588 for setting the number of copies of printing paper to perform printing of. By being equipped with this kind of button group, even with a printer 1 equipped only with a relatively small display, the user can easily perform printing by selecting an image data file stored in the memory card.

When the memory card MC in which the image data file is stored is inserted in the card slot 70 in the printer 1 (see arrow A1 in FIG. 1) and the "Memory Card" button among the mode button group 54 is pressed, the screen shown in FIG. 2 is displayed on the liquid crystal display 40. On the upper level of the liquid crystal display 40 are displayed three types of menu, "Print A11" M11, "Select and Print" M12, and "Easy Print" M13. The "Select and Print" menu M12 is enclosed by a frame S1. The state in FIG. 2 is a state for which the "Select and Print" M12 is provisionally selected.

At the bottom level of the liquid crystal display 40 is displayed a display M22 for describing the processing contents of the "Select and Print" provisionally selected at this point in time. "Select and Print" is the process of the user selecting an image data file from among the plurality of image data files stored in the memory card and printing it. With the status displayed in FIG. 2 in the liquid crystal display 40, it is possible for the user to select "Select and Print" by operating the selection button group 586 (see FIG. 2), and by confirming that selection with the OK button 582, to execute the "Select and Print" process on the printer 1.

Figure 3:
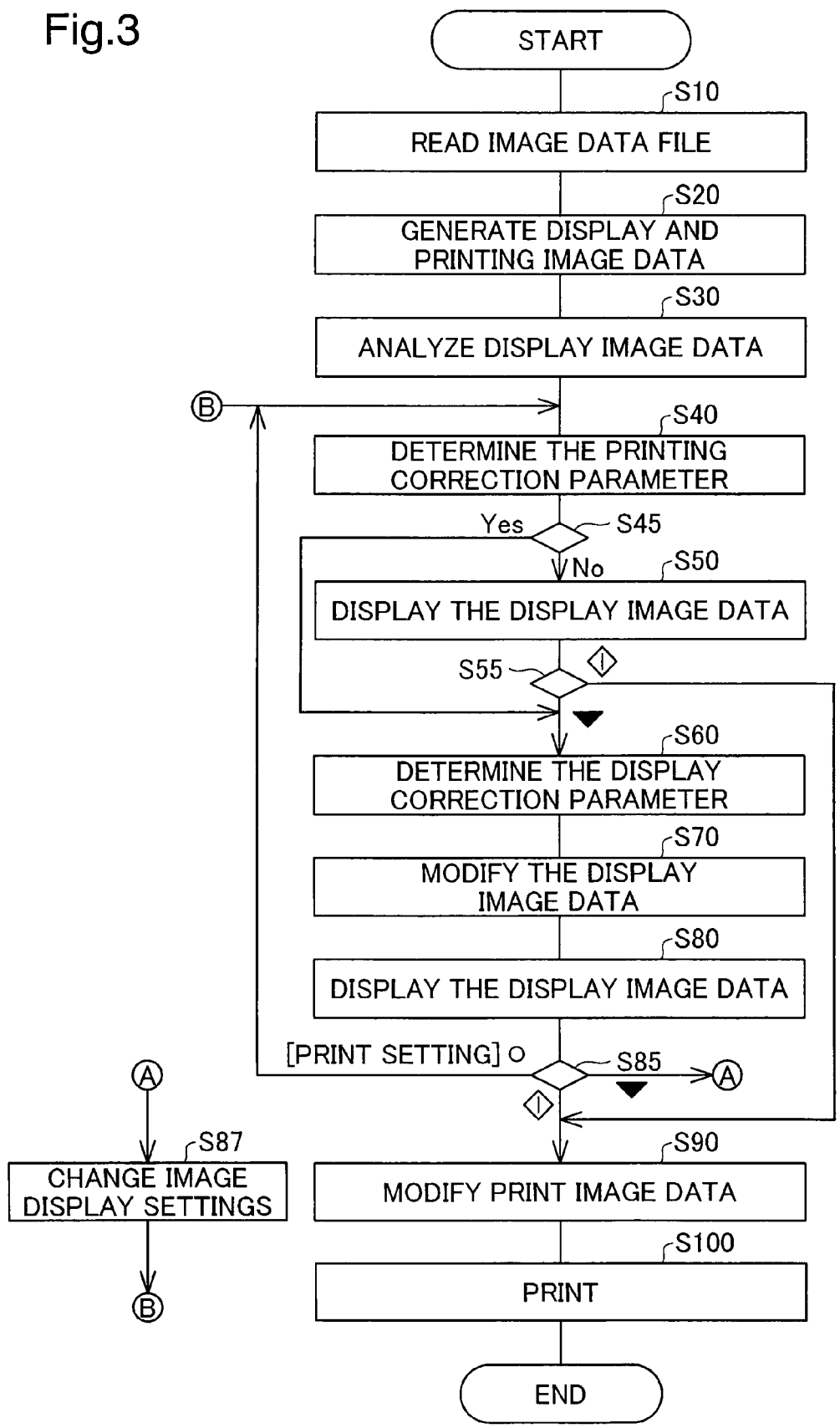
FIG. 3 is a flow chart showing the processing contents of the CPU 100 for "select and print"

FIG. 3 is a flow chart showing the processing contents of the CPU 100 with "Select and Print." At step S10, thumbnails of the image data files stored in the memory card MC are displayed in the liquid crystal display 40. The user operates the selection button group 586 (see FIG. 2) to select a thumbnail, and by confirming that selection using the OK button 582, specifies the image data file to be printed. The CPU 100 reads that image data file from the memory card MC to the main memory 150. The function unit of the CPU 100 that exhibits the function of this step S10 is shown in FIG. 1 as the data acquiring unit 110. Note that the image data file read from the memory card MC is a JPEG format image data file.

At step S20, the CPU 100 does resolution conversion of the original image data of the image data file, and generates the display image data for displaying on the liquid crystal display 40 and printing image data for printing on L size printing paper. The size of the image of the printing image data is, for example, 1260 pixels×1800 pixels. The resolution of the printing image that is printed on the L size (3.5 inch×5.0 inches) printing paper is 360 ppi (pixels/inch). On the other hand, the size of the image of the display image data, to match the L size aspect ratio, is 252 pixels×360 pixels, for example. The resolution of the display image displayed on the liquid crystal display 40 is 112.5 ppi. Note that the size of the printing paper (L size) is set in advance at the point that the "Memory Card" button is pressed.

At step S30, the CPU 100 analyzes the generated display image data. Here, for example, it is determined whether the image of the image data is a first type of image with few clear contour lines, or a second type of image with more clear contour lines compared to the first type of image. The first type of image is an image of a natural landscape, for example. The second type of image is an image largely occupied by a manmade structure such as a building or the like in the middle of the image, for example.

The determination of the image type can be performed as follows, for example. Specifically, the absolute value of the difference of the brightness between adjacent pixels in an image is calculated, and the average value is found. Then, when that average value is greater than a specified reference value, that image is the second type of image. When the average absolute value of the brightness difference is the reference value or lower, that image is the first type of image.

At step S40, the user determines the setting for the image processing for printing, and instructions of those setting are input to the printing device through the user interface screen of the liquid crystal display 40. As a result, the printing correction parameter is determined.

Figure 4:
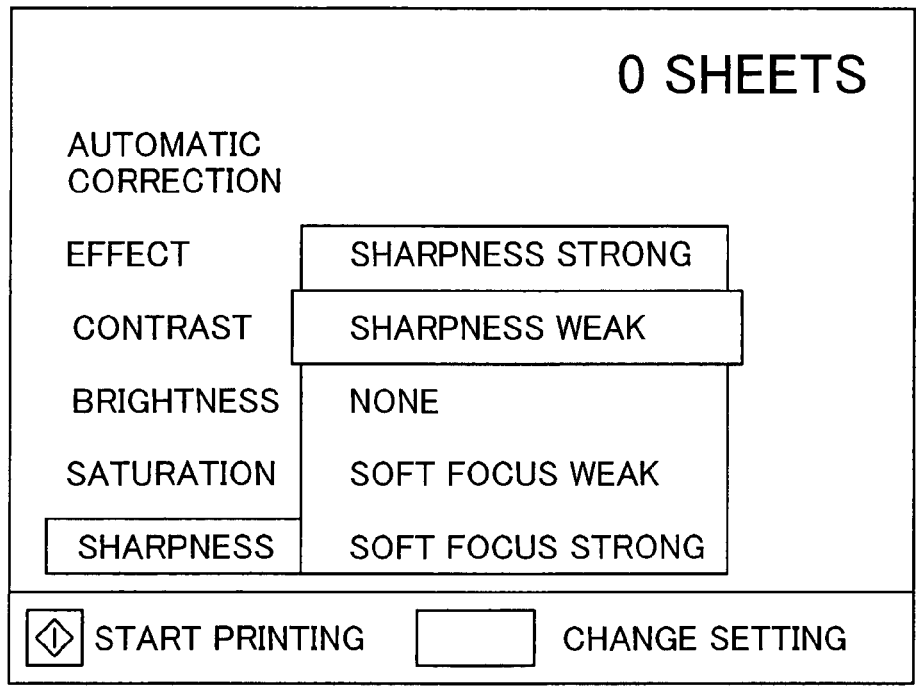
FIG. 4 shows the user interface screen displayed on the liquid crystal display 40 at step S40.

FIG. 4 shows the user interface screen displayed on the liquid crystal display 40 with step S40. The user interface screen of FIG. 4 is displayed on the liquid crystal display 40 by the user pressing the printing setting button 56 (see FIG. 2) at step S40. The user can operate the selection button group 586 and select one of the menus at the left edge of the screen. Here, "Sharpness" is selected. Sharpness is the menu for adjusting the clarity of the image contours.

For items selected by the user, there are further submenus or setting choices displayed in the screen center. In FIG. 4, as the "Sharpness" setting choices, five choices from "Sharpness Strong" to "Soft Focus Strong" are displayed. With this setting, the higher it is, the clearer the image contour, and the lower the setting, the image becomes a blurred contour image. Note that the center "None" is a setting for which image processing is not performed for "Sharpness." In FIG. 4, the choice "Sharpness Weak" is selected.

Note that the term "sharpness" represents the process of making an image contour clear in the narrow sense. However, with this specification, in a broad sense, the term "sharpness" is used as a term that includes the process of "soft focus" which is a process of blurring the image contour in addition to the process of making the image contour clear.

FIG. 5 to FIG. 8 show the sharpness processing contents. In FIG. 5 through FIG. 8, the horizontal axis p represents the pixel position. The vertical axis represents brightness. Here, we describe an example of black and white in one dimension.

Figure 5:
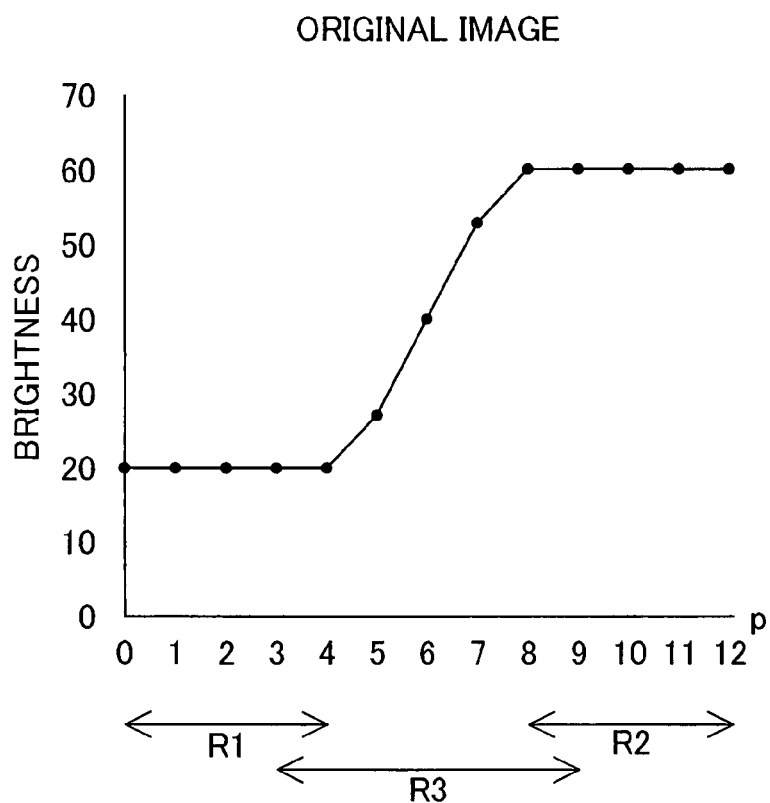
FIG. 5 is a graph representing the brightness of each pixel from pixel positions 0 to 12 of the original image.

FIG. 5 represents the brightness of each pixel of the original image pixel positions 0 to 12. FIG. 5 represents the distribution of the brightness of the brightness 20 area R1 in the image, the brightness 60 area R2, and the boundary part R3 of these. When performing sharpness processing, first, a smoothing process is performed on this brightness distribution. The "smoothing process" is realized by replacing the pixel value of a certain pixel (here, the brightness) with a value for which the weighted average is taken of the pixel value of that pixel and pixels in that pixel periphery.

Figure 6:
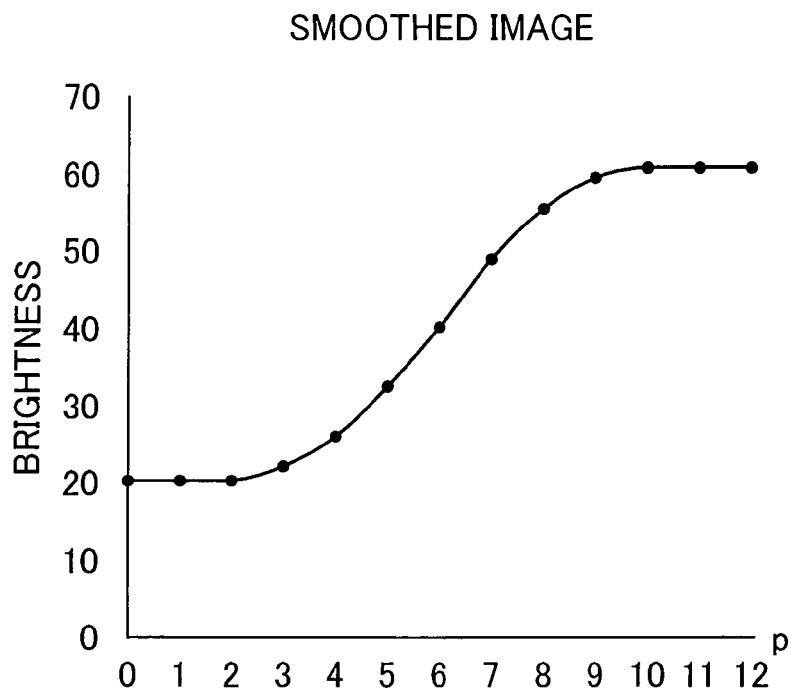
FIG. 6 is a graph representing the brightness of each pixel from pixel position 0 to 12 after smoothing processing.

FIG. 6 represents the brightness of each pixel of pixel positions 0 to 12 after the smoothing process. The new pixel value is affected by the pixel value of the peripheral pixels. Because of this, the distribution of the new pixel values shown in FIG. 6 becomes smoother compared to the distribution of the original pixel values. The "Soft Focus Weak" and the "Soft Focus Strong" processes (see FIG. 4) are processes of replacing the pixel values after smoothing of this FIG. 6 with original pixel values (see FIG. 5) as the new pixel values. The smoothing level is different for the "Soft Focus Weak" and the "Soft Focus Strong" processes.

Figure 7:
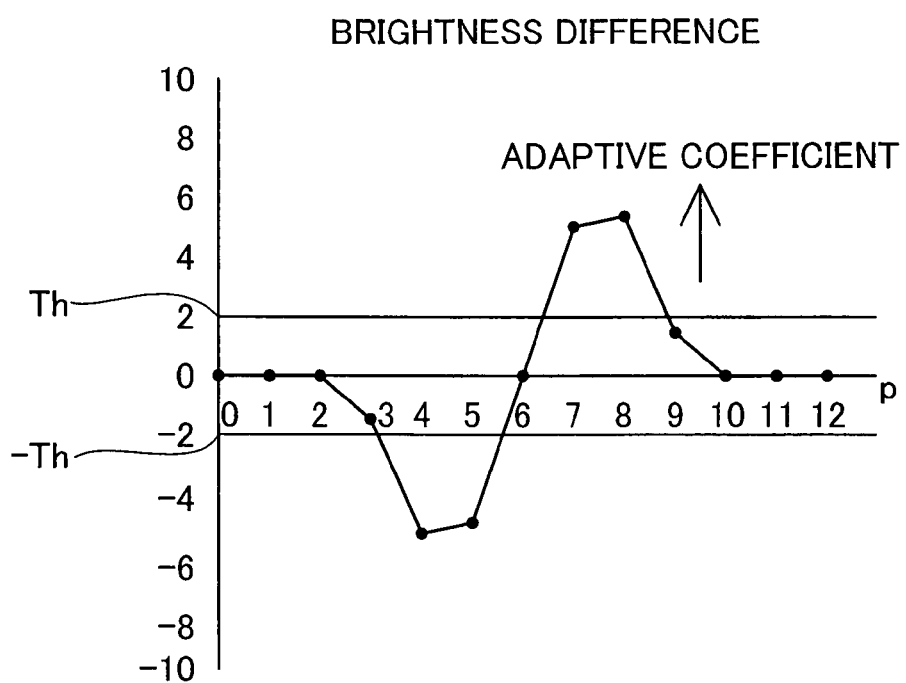
FIG. 7 is a graph of values for which a specified constant is applied to the difference between the pixel values of each pixel position in FIG. 5 and the pixel values of each pixel position in FIG. 6.

FIG. 7 is a graph of values for which a specified constant (called the "Adaptive coefficient") is applied to the difference between the pixel values of each pixel position of FIG. 5 and the pixel values of each pixel position of FIG. 6. The "Sharpness Strong" and the "Sharpness Weak" processes (see FIG. 4) are performed by adding this value of FIG. 7 to the distribution of the original pixel values of FIG. 5. However, of the values in FIG. 7, the items added to the distribution of the original pixel values are only the values for which the absolute value is greater than a specified threshold value Th.

Figure 8:
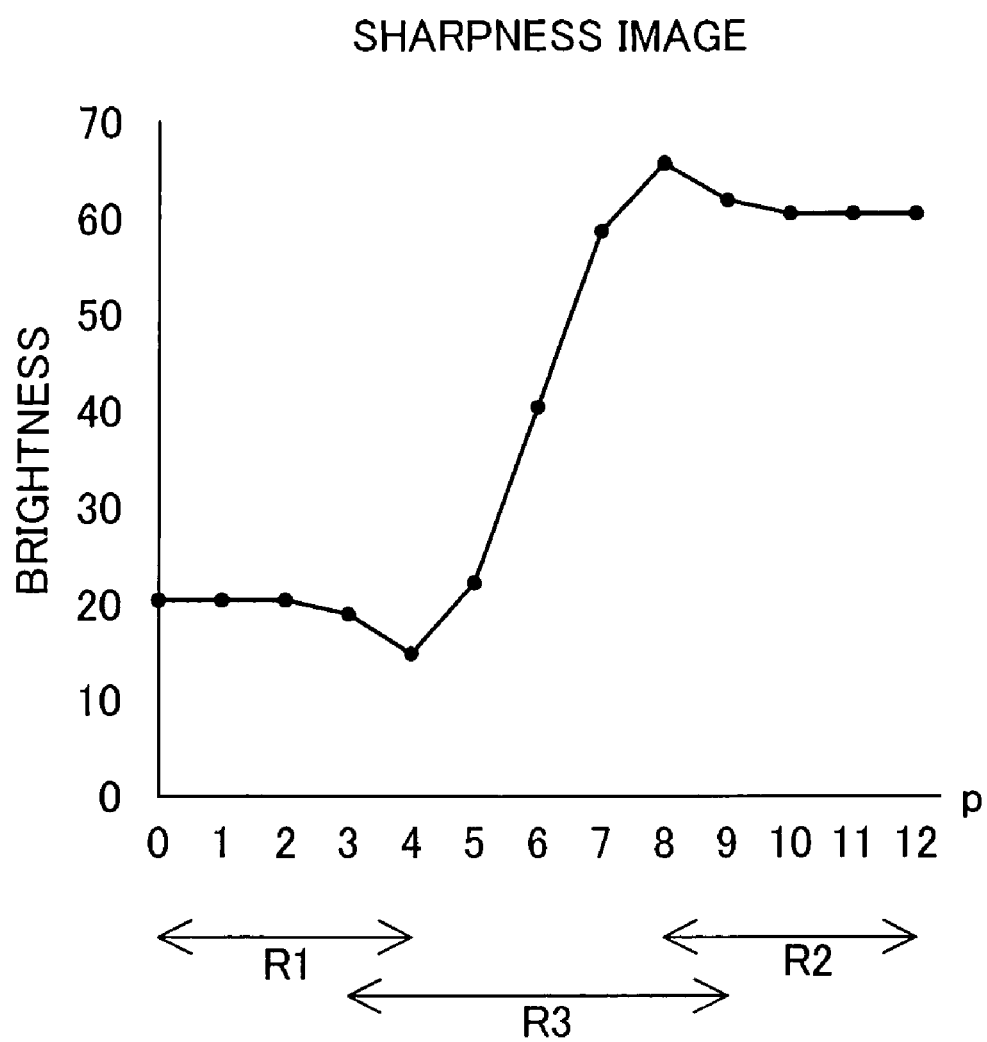
FIG. 8 is a graph representing the distribution of pixel values obtained by adding the values of FIG. 7 to the original pixel value distribution of FIG. 5.

FIG. 8 is a graph representing the distribution of pixel values obtained by adding the values of FIG. 7 to the distribution of the original pixel values of FIG. 5. As can be seen from a comparison of FIG. 5 and FIG. 7, the brightness difference is accentuated in the boundary part R3 of the brightness 20 area R1 and the brightness 60 area R2. The kind of process described above is called "unsharp masking." Note that the smoothing (see FIG. 6) level is different for the "Sharpness Weak" and the "Sharpness Strong" processes.

Figure 9:
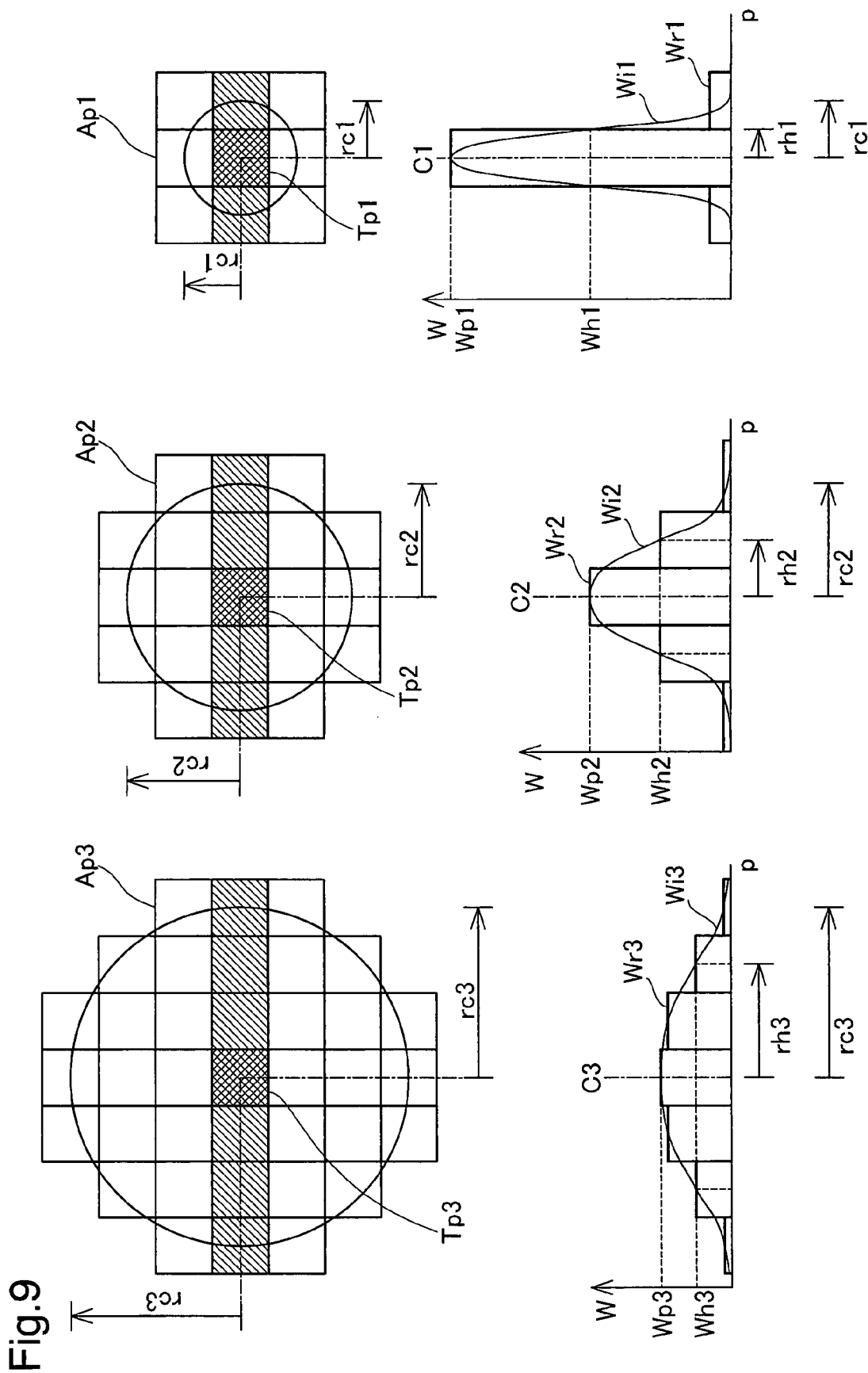
FIG. 9 describes the three types of smoothing processing with different levels.

FIG. 9 describes the three types of smoothing processes of different levels. Shown in the upper level are pixel range Ap1 to Ap3 considered when calculating weighted averages. Each square in the ranges Ap1, Ap2, and Ap3 represents one pixel. The pixels Tp1, Tp2, and Tp3 that have cross hatching positioned at the center of each range are pixels that are subject to replacement of pixel values. With the ranges Ap1 to Ap3, the respective vertical direction dimensions and the horizontal direction dimensions have an almost equal shape. Here, each pixel is square, so for example, the center distance rc3 between the subject pixel Tp3 and the furthest outside pixel of the range Ap3 is equivalent for the vertical direction as well as the horizontal direction. The same is also true for the ranges Ap1 and Ap2. The larger this center distance rci between the subject pixel Tpi and the furthest outside pixel of the scope Api, the smoother the distribution of the pixel value after the smoothing of FIG. 6 (i=1, 2, 3). Then, the larger the center distance rci, the more accentuated the contour of the image after the sharpness processing in its narrow meaning (see FIG. 8).

In the lower level of FIG. 9 are represented weighted average weights Wr1, Wr2, and Wr3 for each pixel included in the ranges Ap1 to Ap3. The bold solid line indicates the actual weight of each pixel, and the thin solid line indicates the weight distributions Wi1, Wi2, and Wi3 represented by the continuous curved line. Note that the pixels for which the weight is indicated in the lower level of FIG. 9 are indicated with cross hatching in the upper level of FIG. 9. For example, each value of the weight Wr1 corresponding to each pixel position corresponds to the average value of Wi1 within the scope of each pixel position. The total of weight Wr1 for the range Ap1 is 1. Each value of weight Wr2 and Wr3 are determined in the same way.

Weights Wi1 to Wi3 are monotonically decreased respectively from centers C1, C2, and C3 toward the outer periphery. As a result, the actual weights Wr1 to Wr3 are also monotonically decreased respectively from the centers C1, C2, and C3 toward the outer periphery. In the lower level of FIG. 9, the maximum values of the weight Wi1, Wi2, and Wi3 are indicated by Wp1, Wp2, and Wp3. Also, the half value of Wp1, Wp2, and Wp3 are shown respectively by Wh1, Wh2, and Wh3. Then, the half value width of the weights Wi1 to Wi3 are shown by rh1, rh2, and rh3.

Note that the "half value width" is an index representing the sharpness of the distribution or waveform peak, and is the distance between the position for which the distribution or wave height is the peak height and the peak position. Here, for example, the distance between the position for which the weight Wi2 is the maximum value Wp2 (the center position of the pixel Tp2 which is the subject of pixel value replacement) and the position for which the weight Wi2 is ½ the maximum value Wp2 is the half value width rh2. The half value widths rh1 and rh3 of the weights Wi1 and Wi3 are determined in the same manner. The larger the half value width, the smoother the distribution of the pixel values after the smoothing in FIG. 6. Then, the larger the half value width, the more accentuated the image contour after the sharpness processing in its narrow meaning (see FIG. 8). With this specification, this half value width is called the "smoothing process radius."

As can be seen from the description above, the broad meaning of sharpness processing is image processing performed based on the pixel positional relationship (see each pixel contained in ranges Ap1 to Ap3 and their weights Wr1 to Wr3).

When doing smoothing processing for the process corresponding to "Soft Focus Strong" (see FIG. 4), the half value width rh and distance rc used are greater than those of the process corresponding to "Soft Focus Weak." Also, when doing the smoothing process for the process corresponding to the "Sharpness Strong," the half value width rh and center distance rc used are greater than those of the process corresponding to "Sharpness Weak" (see FIG. 9). This radius of the smoothing process for the sharpness process and the center distance rc between the subject pixel Tp and the outer periphery pixel of the range Ap is a part of the printing correction parameters determined at step S40 of FIG. 3.

At step S45 in FIG. 3, an examination is made of whether or not "setting to the effect to display on the liquid crystal display 40 the anticipated image of the printing results when the set image processing has been performed" has been done. When "setting to the effect to not display the anticipated image of the printing results" has been done, the process advances to step S50. When "setting to the effect to display the anticipated image of the printing results" has been done, the process advances to step S60. When the process of step S45 is first performed, "setting to the effect to not display the anticipated image of the printing results" is done. Because of this, the process advances to step S50.

At step S50, for confirmation, the display image data (see step S20) generated based on the image data file selected by the user is displayed in the liquid crystal display 40. Note that though not illustrated, displayed in the liquid crystal display 40 are the image of the display image data as well as "display to the effect that the print button 601 or the print button 602 should be pressed when printing the displayed image as is," and "display to the effect that the down arrow button of the selection button group 586 should be pressed when displaying the anticipated image of the printing results."

At step S55, when printing the displayed image as is, the user presses the print button 601 or the print button 602. When the print button 601 or the print button 602 are pressed, the process advances to step S90. On the other hand, when displaying the anticipated image of the printing results, the user presses the down arrow button of the selection button group 586. When the down arrow button of the selection button group 586 is pressed, the process advances to step S60. Note that with step S55 of FIG. 3, the button is shown correlated respectively to the process branches (see FIG. 2).

At step S60, the display correction parameter is determined. For example, the smoothing radius as the display correction parameter is determined based on the smoothing radius as the printing correction parameter determined at step S40, the pixel count Px1 of the printing image data, and the pixel count Px2 of the display image data. Note that with this embodiment, the "pixel count Px1 of the printing image data" and the "pixel count Px2 of the display image data" are the respective horizontal width direction pixel counts. In specific terms, the pixel count Px1 of the printing image data is 1800 pixels. The pixel count Px2 of the display image data is 360 pixels.

FIG. 10 is a chart showing the relationship between the radius of the smoothing process as the display correction parameter determined at step S60 and the radius of the smoothing process as the printing correction parameter determined at step S40. With FIG. 10, shown are examples for a case of strong sharpness and a case of weak sharpness (see FIG. 4). Note that in the chart of FIG. 10, the "Adaptive coefficient" is the numerical value representing what % of the difference of the pixel values before and after smoothing is added to the original pixel value (see FIG. 7). Also, the "threshold value" is a numerical value. The difference of the pixel values before and after smoothing rises to the original pixel value when the difference between the brightness of a certain area and the brightness of the area adjacent to that area equal to a value of the threshold value or greater (see Th in FIG. 7).

The ratio of the horizontal width Px2 of the image of the display image data in relation to the horizontal width Px1 of the image of the printing image data is Rpx. Then, the ratio of the smoothing process radius rv applied to the display image data in relation to the smoothing process radius rp applied to the printing image data is Rr.

$$Rpx = Px2/Px1 \quad (1)$$

$$Rr = rv/rp \quad (2)$$

At this time, Rpx and Rr preferably satisfy the following relationship. Cr is a specified coefficient.

$$Rr = Cr \times Rpx \quad (3)$$

$$0.5 \leq Cr \leq 2.0 \quad (4)$$

Thus, from formulas (1) through (4), it is possible for the smoothing process radius rv applied to the display image data to be represented as shown below.

$$rv = Cr \times rp \times Px2/Px1 \quad (5)$$

Compared to the process for which the sharpness level is strong, the process when the sharpness level is weak preferably has a large Rr (see formula (2)). The Rr of the first sharpness process is Rr1, the Rr of the second sharpness process that is a weaker level than the first sharpness process is Rr2. At this time, it is preferable that Rr1 and Rr2 satisfy the following relationship.

$$Rr1 \leq Rr2 \quad (6)$$

For example, with this embodiment, the horizontal width Px1 of the printing image data is 1800 pixels, and the horizontal width Px2 of the display image data is 360 pixels. Specifically, the ratio Rpx of the horizontal width Px2 of the display image data in relation to the horizontal width Px1 of the printing image data is 0.2. At this time, from the formulas (3) and (4), it is preferable that Rr be 0.10 to 0.40. Furthermore, it is preferable that all Rr be a value of Rpx (0.2) or greater.

With the example in FIG. 10, the ratio Rr1 when the sharpness is strong is 0.25, and the ratio Rr2 when the sharpness is weak is 0.33. Then, the sharpness weak process has an Rr greater than the sharpness strong process. Note that with this embodiment, the adaptive coefficient and the threshold value are not changed when applied to the printing data and when applied to the display data.

Note that FIG. 10 is a chart referenced when printing an image in L size. In the ROM 160 of the printer 1, in addition to the chart of FIG. 10 for the L size, similar charts are stored according to various printing paper sizes such as A4 size, A5 size, B4 size, B5 size, and the like. The CPU 100 references these charts according to the printing paper size and performs the sharpness processing.

At step S70 of FIG. 3, the display image data is modified according to the display correction parameters of the smoothing process radius rv and the like determined at step S60. By performing a process like that of step S60 and S70, when executing printing by performing sharpness processing on the printing image data, it is possible to display on the liquid crystal display 40 in advance an image such as one for which the user would receive an impression similar to that of the printing results for which that sharpness processing was applied. Note that the function unit of the CPU 100 that executes the processes of steps S20 to S70 are shown in FIG. 1 as the image processing unit 120.

At step S80, an image is displayed on the liquid crystal display 40 based on the modified display image data. Note that together with the image, displayed are (1) a display to the effect that the print button 601 or the print button 602 should be pressed when printing the displayed image as is, (2) a display to the effect that the print setting button 56 should be pressed when changing the printing settings, and (3) a display to the effect that the down arrow button of the selection button group 586 should be pressed when changing to a different setting from the current setting of whether or not to display the anticipated image of the printing results. Note that at step S80, the function unit of the CPU 100 that executes the process of displaying the image on the liquid crystal display 40 based on the display image data is shown in FIG. 1 as the display unit 130. The display unit 130 can selectively display on the liquid crystal display 40 the image of the display image data before modification and the image of the display image data after modification.

At step S85, the user views the image displayed on the liquid crystal display 40. Then, if that image is to be printed, the print button 601 or the print button 602 is pressed. In that case, the process advances to step S90. As a result of viewing the image displayed on the liquid crystal display 40, when one wishes to redo the image process settings, the print setting button 56 is pressed. In that case, the process returns to step S40. Furthermore, in a case when redoing the image processing settings, when changing the setting of whether or not to display the anticipated image of the printing results to a setting different from the current state, the user presses the down arrow button of the selection button group 586. In that case, the process advances to step S87. Note that with step S85 in FIG. 3, the button is shown respectively correlated to the process branches (see FIG. 2).

At step S87, the setting of whether or not to display the anticipated image of the printing results is changed, and that setting is stored in the main memory 150 of the printer 1. Specifically, when "setting to display the anticipated image of the printing results" has been done up to then, this is changed to "setting to not display the anticipated image of the printing results." When "setting to not display the anticipated image of the printing results" has been done up to then, this is changed to "setting to display the anticipated image of the printing results." Then, the process returns to step S40.

When the process returns from step S85 or S87 to step S40, the user again re-determines the image processing setting for printing, and input those setting instructions to the printing device through the user interface screen of the liquid crystal display 40 (see FIG. 4). As a result, the printing correction parameters are determined.

After that, at step S45, an examination is done of whether or not a setting is done to have on the liquid crystal display 40 a display to the effect of displaying the anticipated image of the printing results when image processing of the set contents is performed. When a "setting to the effect of displaying the anticipated image of the printing results on the liquid crystal display 40" is done up to then, the process skips steps S50 and S55 and advances to step S60. Meanwhile, when a "setting to the effect to not display the anticipated image of the publishing results" has been done, the process advances to step S50.

Following, the process up to step S85 is performed as has already been described.

At step S90, the printing image data is modified according to the printing correction parameters determined at step S40. It is the image processing unit 120 as the function unit of the CPU 100 that executes the processing of this step S90.

Then, at step S100, printing is executed based on the printing image data after modification. The function unit of the CPU 100 that executes the processing of this step S100 is shown in FIG. 1 as the printing unit 140.

With this kind of aspect of this embodiment, after confirming the image of step S80 for which display close to that of the printing results is performed, the user is able to determine whether or not to perform printing of the image data. To say this another way, there is a low possibility of the printing paper being wasted because the printing results and the expectation before printing are different.

Also, with this embodiment, the user can select whether or not to display the anticipated image of the printing results on the liquid crystal display 40 of his own will (see step S55 and S85 of FIG. 3). Because of this, a user who does not wish to confirm the anticipated image of the printing results is able to rapidly execute printing.

B. Second Embodiment

The second embodiment has the printing correction parameters (see step S40) and the display correction parameters (see step S60) determined according to the image analysis results at step S30 in FIG. 3. The other points of the second embodiment are the same as the first embodiment.

FIG. 11 is a chart showing the smoothing process radius rv as the display correction parameter determined at step S60 and the smoothing process radius rp as the printing correction parameter determined at step S40 with the second embodiment. In FIG. 11 as well, shown is an example regarding a case when sharpness is strong and a case when sharpness is weak (see FIG. 4).

The letters that represent the ratio of the smoothing process radius rv applied to the display image data in relation to the smoothing process radius rp applied to the printing image data is determined as follows. The ratio is Rr11 with sharpness strong and the first type of image with few contour lines. The ratio is Rr12 with sharpness strong and the second type of image with many contour lines. The ratio is Rr21 with sharpness weak and the first type of image. The ratio is Rr22 with sharpness weak and the second type of image.

With the example in FIG. 11, the ratio Rr12 when the sharpness is strong with the second type of image with many contour lines is smaller than the ratio Rr11 when the sharpness is strong with the first type of image. Also, the ratio Rr22 when the sharpness is weak with the second type of image with many contour lines is smaller than the ratio Rr21 when the sharpness is strong with the first type of image. Furthermore, the ratios Rr11, Rr12, Rr21, and Rr22 are all greater than values of Rpx (0.2).

With the display of the liquid crystal display, compared to printing results with ink, the user senses the image contour as being accentuated. Thus, with this kind of aspect, it is possible to display an image closer to the impression received from the printing results on the display.

Also, with the example in FIG. 11, the adaptive coefficient when the sharpness is strong is greater than the adaptive coefficient in relation to an image of the same type when the sharpness is weak. In this way, it is possible to more effectively accentuate the image contour.

C. Third Embodiment

With the third embodiment, described is the process when performing printing with a texture such as a so-called "mat" on the printing image. With the third embodiment, at steps S40, S60, S70, and S90 of FIG. 3, in addition to the process performed with the first embodiment, additional processing is performed. The other points of the third embodiment are the same as the first embodiment.

With the third embodiment, at step S40 of FIG. 3, the user specifies whether or not to perform "mat" printing through the user interface screen of the liquid crystal display 40. Then, the printing correction parameter $\lambda 1$ relating to the "mat" printing is determined according to that specification. At step S90, the image processing for realizing "mat" printing is performed on the printing image data according to the printing correction parameter $\lambda 1$ determined at step S40.

Figure 12A:
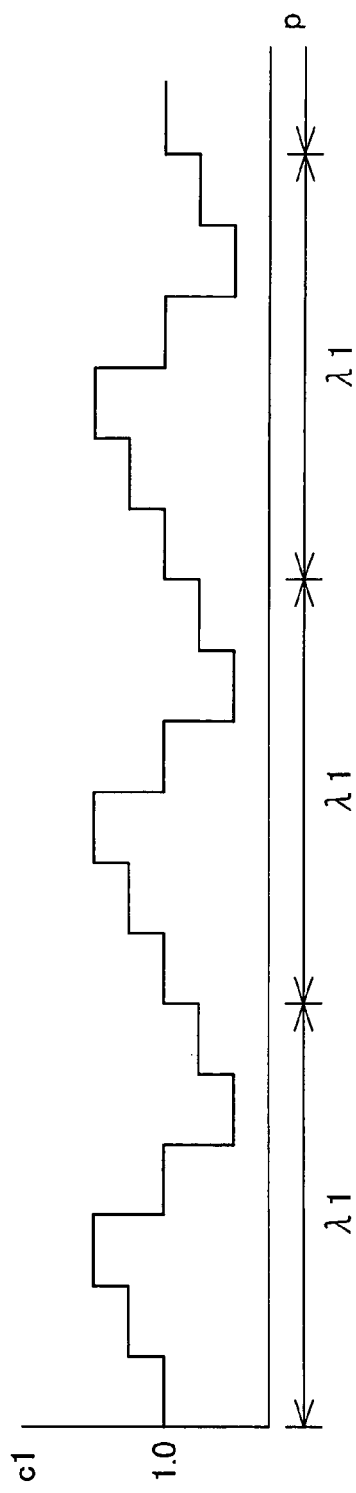
FIG. 12A is a graph showing the coefficient c1 for realizing mat printing.
Figure 12B:
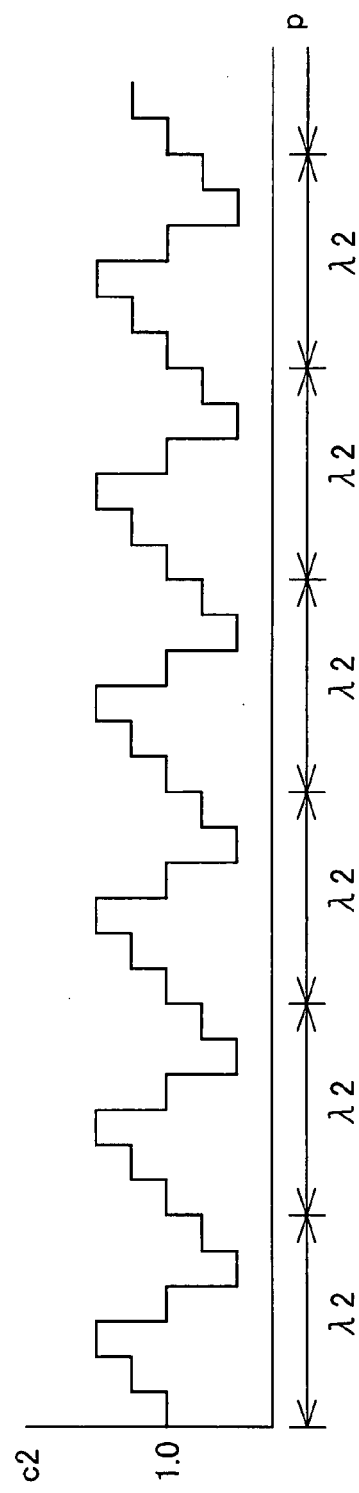
FIG. 12B is a graph showing the coefficient c2 for realizing the anticipated image of the printing results.

FIG. 12A shows graph showing the coefficient c1 for realizing the "mat" printing using the printing image data. FIG. 12B shows graph showing the coefficient c2 for realizing the anticipated image of the printing results of the "mat" using the display image data. The horizontal axis p of each graph represents the pixel position. Here, we describe an example when one dimensional.

At step S90, the color of each pixel is changed by applying the coefficient c1 to the gradation values representing the color of each pixel that the printing image data has. As shown in FIG. 12A, the size of the coefficient c1 changes cyclically along the direction of the pixel alignment. The size of that cycle is $\lambda 1$. $\lambda 1$ is represented by the pixel count. Specifically, for a pixel P1 and a pixel P2 at a distance of $\lambda 1$ from pixel P1, the same coefficient is applied to the gradation values representing the colors to modify the gradation values. Note that the average value in 1 cycle of the coefficient c1 is 1.0.

By performing the kind of process noted above, it is possible to cyclically change the color of each pixels that are included in the printing image data, according to that pixel position. By performing this process for the vertical direction and horizontal direction of the image, it is possible to generate image data of an image with a texture such as a so-called "mat" or "matte" or the like added. Specifically, the image process for adding a texture such as a "mat" or "matte" or the like to an image is image processing performed based on the positional relationship between pixels in an image.

Meanwhile, at step S60 of FIG. 3, the display correction parameter $\lambda 2$ relating to the anticipated image of the printing results of the "mat" printing is determined. In specific terms, the display correction parameter $\lambda 2$ is determined by referencing the table stored in the ROM 160 based on the printing correction parameter $\lambda 1$ determined at step S40, the pixel count Px1 of the printing image data, and the pixel count Px2 of the display image data. The parameter $\lambda 2$ determined in this way fulfills the following conditions.

$$\lambda 2/\lambda 1 = Ct \times Px2/Px1 \quad (7)$$

$$0.5 \leq Ct \leq 2.0 \quad (8)$$

At step S70, the image process for reproducing the anticipated image of the "mat" printing is performed on the display image data according to the display correction parameter $\lambda 2$ determined at step S60. In specific terms, the color of each pixel is changed by applying a specified coefficient c2 to the gradation value of the color of each pixel that are included in the display image data. As shown in FIG. 12B, the size of the coefficient c2 changes cyclically along the direction in which the pixels are aligned. The size of that cycle is $\lambda 2$. $\lambda 2$ is represented by the pixel count. Specifically, for a pixel P3 and a pixel P4 at a distance of $\lambda 2$ from pixel P3, the same coefficient is applied to the gradation values representing the colors to modify the gradation values. Note that the average value in 1 cycle of the coefficient c2 is 1.0. When the coefficient c1 waveform cycle is converted from $\lambda 1$ to $\lambda 2$, this matches the coefficient c2 waveform.

Using the printing correction parameter $\lambda 1$ and the display correction parameter $\lambda 2$ that satisfy the kind of conditions noted above, by correcting the respective printing image data and display image data, the following effect is obtained. Specifically, when executing printing with a texture added, it is possible to display on the liquid crystal display 40 in advance an image like the one for which the user receives an impression similar to the printing effect with that texture added.

Note that with the display correction parameter $\lambda 2$, the same as Rr with the first and second embodiments, it is possible to set this according to the level of sharpness (see FIG. 4) or the image type (see FIG. 10 and FIG. 11).

D. Fourth Embodiment

With the fourth embodiment, the process is described when printing by transforming the person's face in the image, such as making the human face jaw line thinner or the like. With the fourth embodiment, at steps S40, S60, S70, and S90 of FIG. 3, in addition to the processing performed with the first embodiment, additional processing is performed. The other points of the fourth embodiment are the same as the first embodiment.

With the fourth embodiment, at step S40 of FIG. 3, the user specifies whether or not to execute printing by performing "enhancement processing" through the user interface of the liquid crystal display 40. "Enhancement processing" is the image processing of modifying an image so as to make the human face jaw line taken in the photograph thinner, or making the eyes bigger. At step S40, printing correction parameters La1max, Lx1max and the like relating to enhancement processing are determined according to specification of the presence or absence of enhancement processing. At step S90, the image processing for realizing "enhanced" printing is performed on the printing image data according to the printing correction parameters La1max, Lx1max and the like determined at step S40.

Figure 13A:
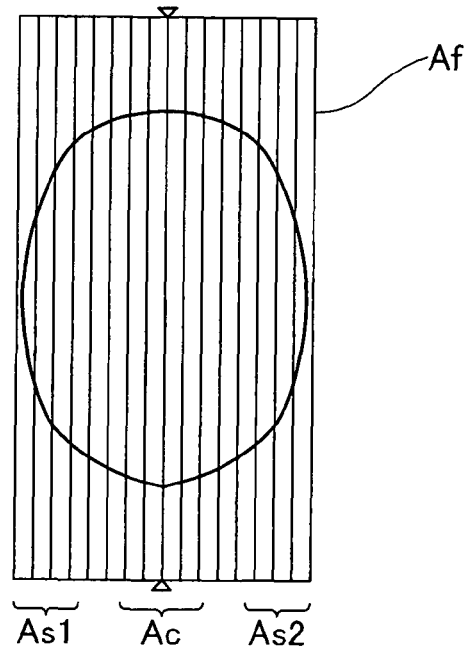
Figure 13B:
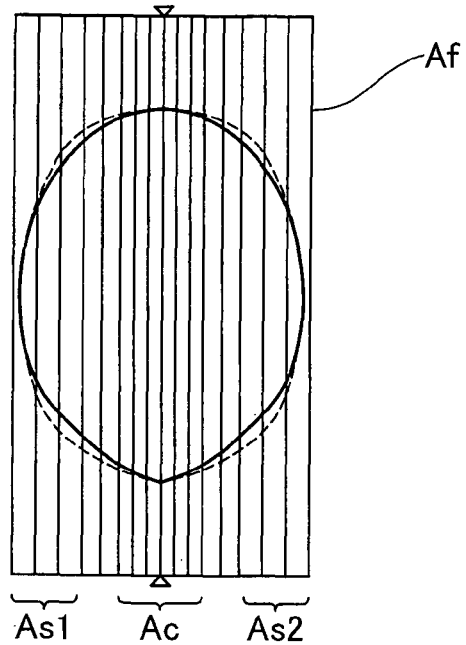

FIGS. 13A and 13B show the processing contents of making the jaw line thinner among the enhancement processes. FIG. 13A shows the contour of the human face of the original image. The vertical line indicates the position of the pixel array. With the process of making the jaw line thinner, the pixel values of at least part of the pixels within the face area Af are replaced with pixel values calculated using the pixel values of one or more pixels including other pixels.

FIG. 13B shows the contour of a human face in the image after the process of making the jaw line thinner has been done. Note that the contour of the human face for the original image is shown by broken lines. The vertical line shows each pixel array of the original image shown in FIG. 13A. With the process of making the jaw line thinner, after specifying the face area Af, for the part near the center of the face Ac of the image of that area Af, this is modified to be more toward the center of the face, so that the width is narrower. Then, of the image of the face area Af, for the parts of the edge far from the center line of the face As1 and As2, this is modified for the width to be wider. Note that in FIGS. 13A and 13B, the face center line is the line with a triangle attached to the top and bottom edges.

Figure 14:
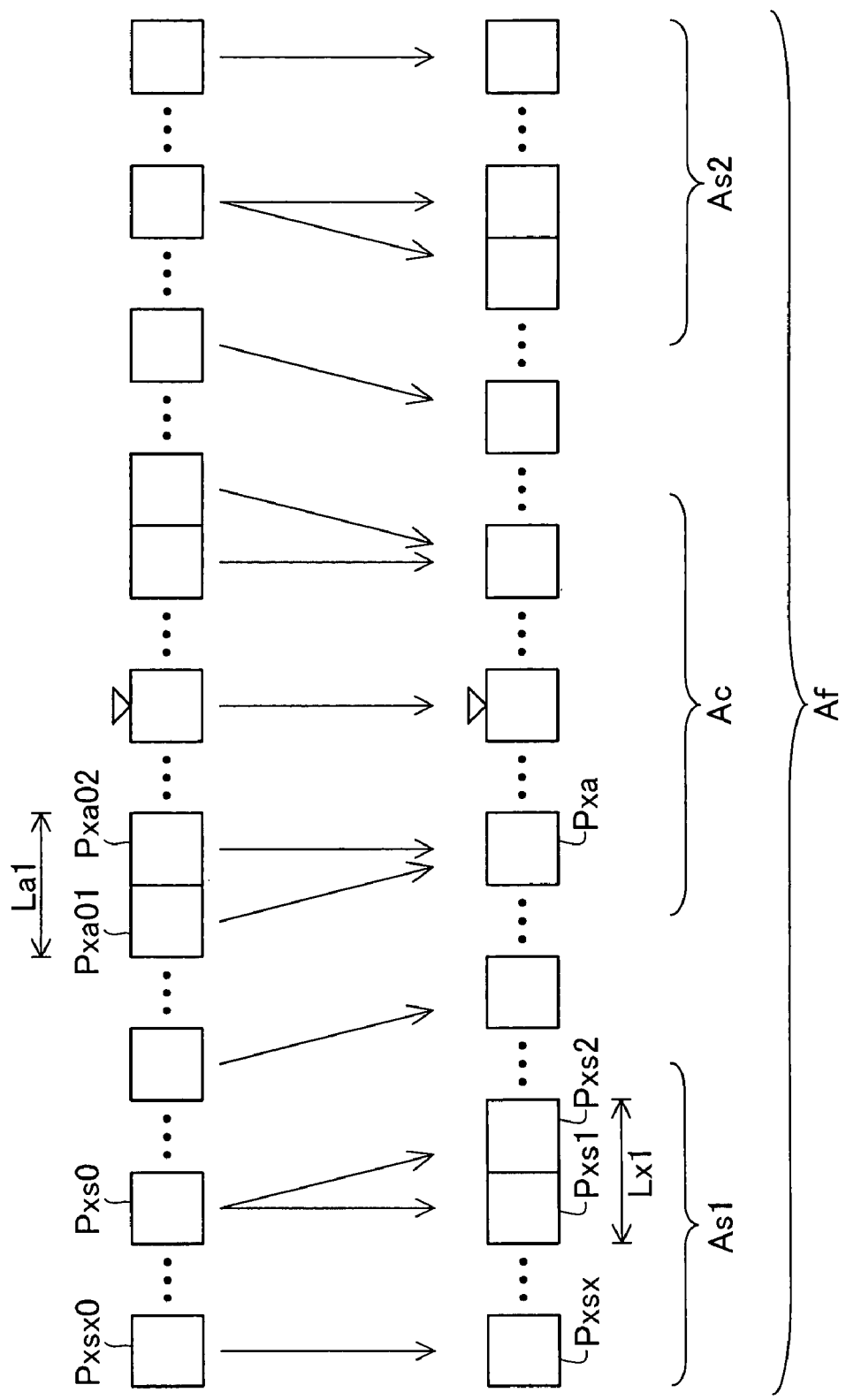
FIG. 14 shows the pixel value replacement method for the process of making the jaw line thinner.

FIG. 14 shows the replacement method of the pixel values for the process of making the jaw line thinner. The squares shown at the upper level represent the pixels of the original image aligned in the almost perpendicular direction to the face center line. The squares shown in the lower level represent the pixels of the image after the process of aligning in almost a perpendicular direction to the face center line. Here, we describe printing image data as an example. Also, the face center line is made to be parallel to the vertical direction of the image of the printing image data.

With the part Ac near the center of the face area Af, the pixel value representing the color of the pixel Pxa of the image after processing is calculated based on the pixel value of the plurality of pixels Pxa01 and Pxa02 of the original image.

Meanwhile, with the part As1 at the left edge of the face area Af, the pixel value representing the color of the pixel Pxs0 of the original image is used to calculate the pixel values of the plurality of pixels Pxs1 and Pxs2 of the image after processing. Note that the pixel value of the pixel Pxsx of the edge after processing is the same as the pixel value of the pixel Pxsx0 of the edge of the face area Af of the original image. The same processing is also performed on the part As2 at the right edge of the face area Af.

With this kind of processing, image processing is realized that modifies the width for the part Ac near the center of the face area Af to be narrower, and modifies the width of the edge parts As1 and As2 to be wider. Specifically, the process of making the human jaw line in the image thinner is the image process performed based on the positional relationship between pixels in the image.

With the processing of the printing image data, for the part Ac near the center of the face area Af, the maximum value of the pixel count considered when calculating the pixel value of one pixel is La1 max. Also, with the processing of the printing image data, for the parts As1 and As2 at the left and right edges of the face area Af, the maximum value of the number of pixels for which the pixel value is calculated using the pixel value of one pixel in common is Lx1max. These La1max and Lx1max are part of the printing correction parameters. Note that in FIG. 14, La1 is shown as an example of the pixel count considered when calculating the pixel value of one pixel. Also, Lx1 is shown as an example of the number of pixels for which the pixel value is calculated using the pixel value of one pixel in common.

With the processing of the display image data, with the part Ac near the center of the face area Af, the maximum value of the pixel count considered when calculating the pixel value of one pixel is La2max. Also, with the processing of the display image data, with the parts As1 and As2 of the left and right edge of the face area Af, the maximum value of the number of pixels for which the pixel value is calculated using the pixel value of one pixel in common is Lx2max. These La2max and Lx2max are part of the display correction parameters.

The display correction parameter La2max satisfies the following conditions.

$$La2max/La1max = Cca \times Px2/Px1 \quad (9)$$

$$0.5 \leq Cca \leq 2.0 \quad (10)$$

Similarly, the display correction parameter Lx2max satisfies the following conditions.

$$Lx2max/Lx1max = Ccx \times Px2/Px1 \quad (11)$$

$$0.5 \leq Ccx \leq 2.0 \quad (12)$$

Note that the display correction parameters La2max and Lx2max are determined by referring to the table stored in the ROM 160 based on the printing correction parameters La1 max and Lx1max determined respectively at step S40, the printing image data pixel count Px1, and the display image data pixel count Px2.

With the above, we described the process of the enhancement processing of making the jaw line thinner, but the process of making the eyes larger is performed in the same way. Specifically, with the process of making the eyes larger, first, the designated area containing the eyes is specified. Then, for the part Ace near the center in the vertical direction of the eye of the image of the area Ae of the eye, this is modified so that the width is broader. Then, with the parts Ase1 and Ase2 of the edges farther from the vertical direction of the eye than the center part Ac3 of the image of the eye area Ae, these are modified to have the width be narrower. For these processes as well, similarly, the display correction parameter is determined so that the ratio of the printing correction parameter and the display correction parameter is contained in a specified range containing the ratio of the image pixel counts of the printing image data and the display image data.

Note that the enhancement processing including the process of making the eyes of the human in the image larger and the process of making the jaw line narrower are image processes that are performed based on the positional relationship between pixels in the image.

At step S70 of FIG. 3, the image processing for reproducing the anticipated image of the enhancement printing is performed on the display image data according to the display correction parameters La2max, Lx2max or the like determined at step S60.

The following kind of effect can be obtained by correcting the respective printing image data and display image data using the printing correction parameters La1max, Lx1max and the like and display correction parameters La2max, Lx2max and the like that satisfy the kind of conditions noted above. Specifically, when executing printing making the human jaw line thinner and making the eyes larger, it is possible to display on the liquid crystal display 40 in advance an image like one for which the user would receive an impression similar to the printing results.

Note that Cca and Ccx can be set according to the sharpness level (see FIG. 4) or the image type (see FIG. 10 and FIG. 11) the same as with Rr of the first and second embodiments.

E. Fifth Embodiment

With the first to fourth embodiments, we described printer aspects that can independently perform printing based on image data files stored in the storage medium without being connected to an external computer (see FIG. 1). With the fifth embodiment, described is a printing system equipped with a viewer 3 that can display the image of the image data and a printer 1b that performs printing by fetching image data from the viewer 3.

Figure 15:
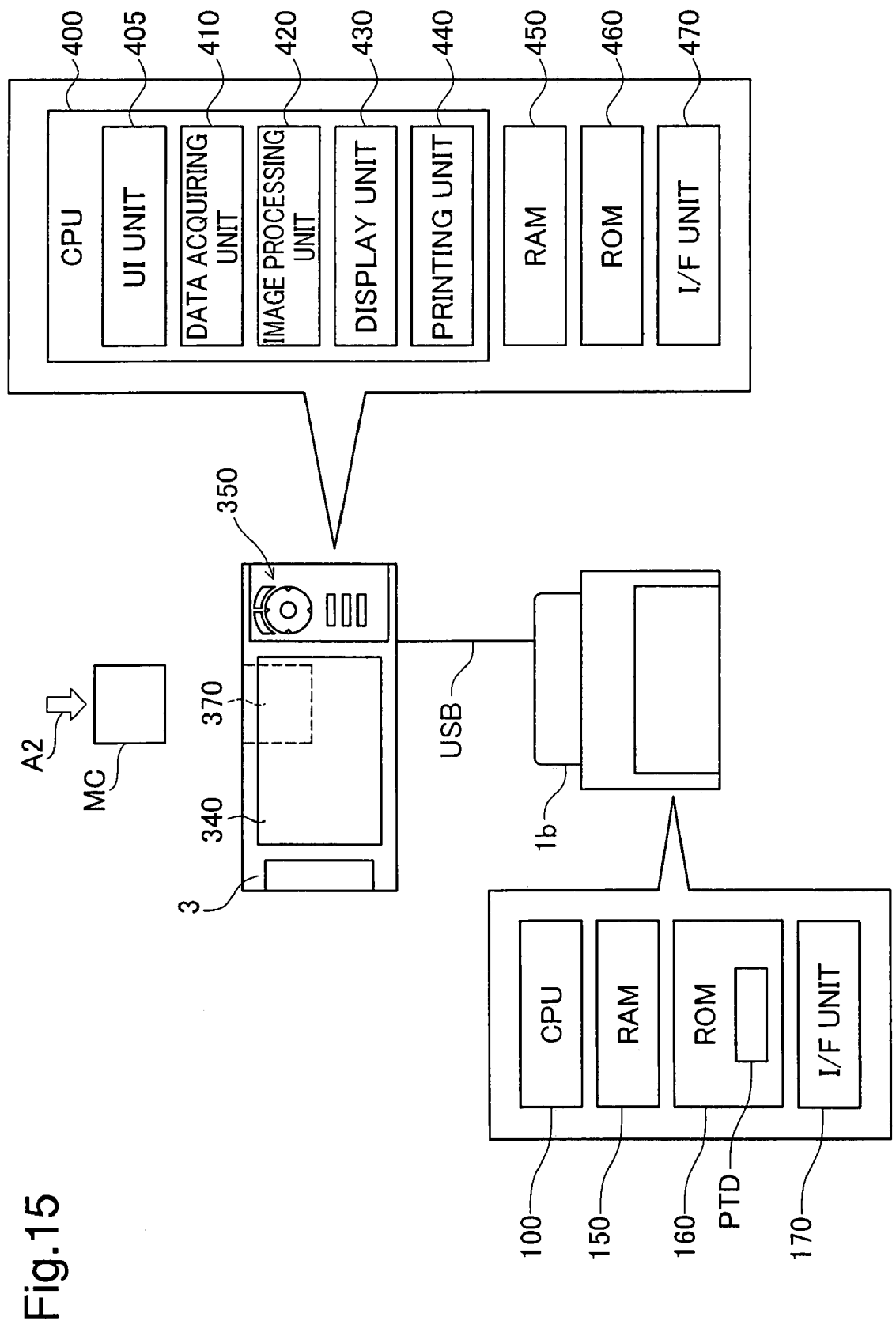
FIG. 15 shows the printing system equipped with the viewer 3 and the printer 1b which is an embodiment of the invention.

FIG. 15 shows a printing system equipped with the viewer 3 and the printer 1b as an embodiment of another aspect of the invention. The viewer 3 is connected to the printer 1b without being connected to an external computer, and it is possible to print images on the printer 1b independently based on the image data file stored in the storage medium MC.

The viewer 3 is equipped with a liquid crystal display 340, a button group 350 for the user to perform various operations, a card slot 370 for inserting the memory card MC into and reading data, a CPU 400, a main memory 450, a ROM 460, and an interface unit 470 for performing information exchange with the outside.

Note that in FIG. 15, the main memory 450 is noted as "RAM 450." Also, the interface unit 470 is noted as "I/F unit 470." Also, in FIG. 15, to make the description easier to understand, the CPU 400, the main memory 450, the ROM 460, and the interface unit 470 are displayed outside the viewer 3.

The card slot 370 can have a memory card MC such as a compact flash (trademark), an SD card, a mini SD card or the like inserted directly into the slot, or can have them inserted via an adapter (see arrow A2 of FIG. 15). The CPU 400 can fetch a plurality of image data files stored in these memory cards MC inserted in the card slot 370.

The interface unit 470 performs data exchange with the printer 1b. The printer 1b and the viewer 3 can be connected by a USB (Universal Serial Bus), for example.

The printer 1b has the interface unit 170 for performing data exchange with the viewer 3. The other hardware constitution of the printer 1b is the same as the printer 1 of the first embodiment.

The printer 1b stores model data PTD in the ROM 160. The model data PTD includes the resolution (pixels/inch) of each printing mode that can be executed by the printer 1b and the information of the type of paper used with each printing mode. Note that the resolution that can be realized by the printer differs according to the printer model. The type of printing paper that can be processed by the printer also differs according to the printer model.

Figure 16:
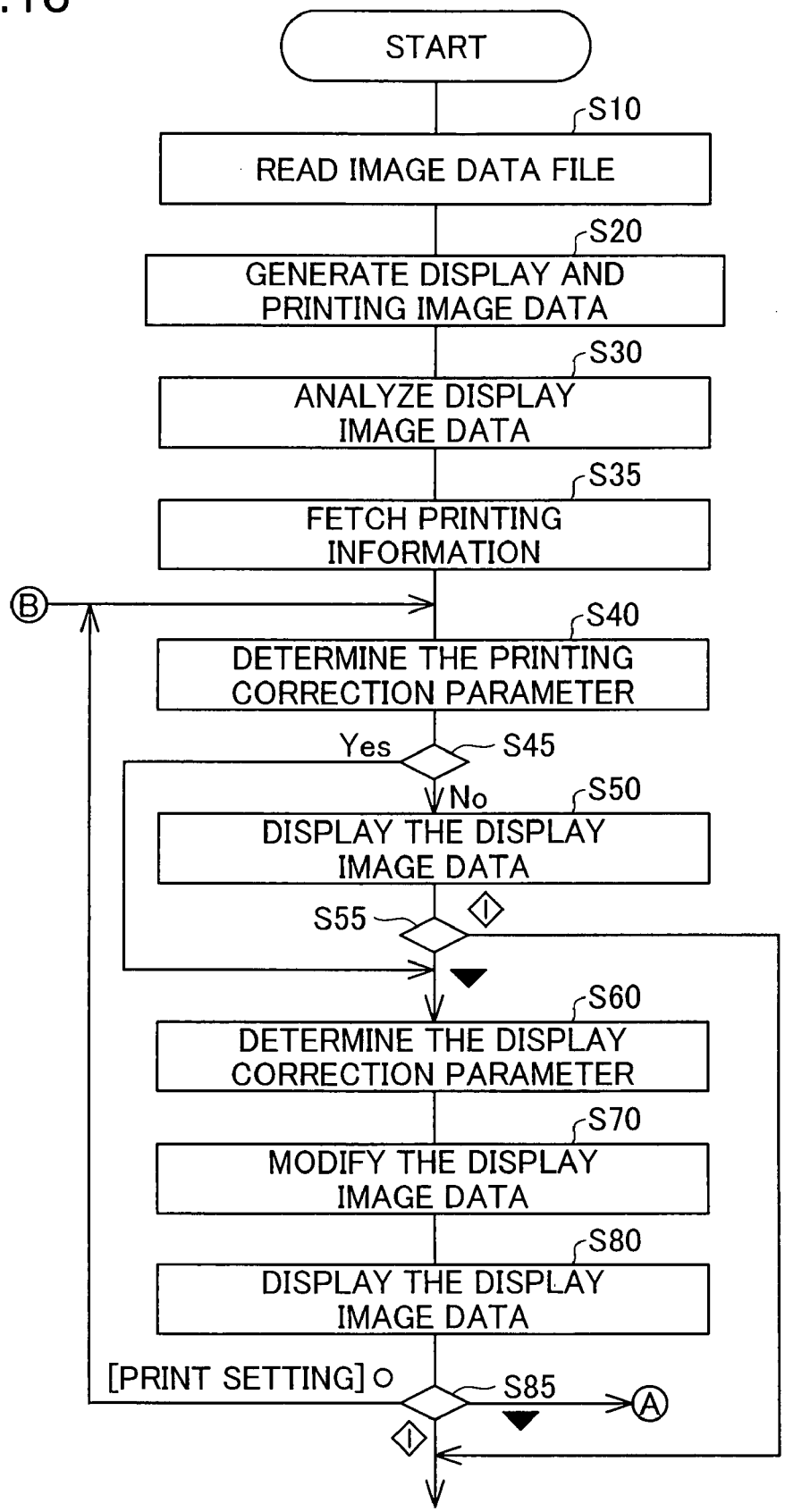
FIG. 16 is a flow chart showing the processing contents of the CPU 400 of the viewer 3 for "select and print"

FIG. 16 is a flow chart showing the processing contents of the CPU 400 of the viewer 3 for "select and print." The process of FIG. 16 includes step S35. Then, the process of step S60 is performed reflecting the results of the process of step S35. The other points of the process of FIG. 16 are the same as the process in FIG. 3. Note that with FIG. 16, to display each step sufficiently largely, the display of step S87 and below is omitted.

With the first embodiment, each process of FIG. 3 is executed by the CPU 100 of the printer 1 of the first embodiment. In contrast to this, with the fifth embodiment, each process of FIG. 16 is executed by the CPU 400 of the viewer 3. When performing each process of FIG. 16, the CPU 400 of the viewer 3 displays a specified image on the liquid crystal display 340 (see FIG. 2 and FIG. 4), and the user input is received via the button group 350. Then, when performing each process of FIG. 16, the CPU 400 performs data exchange with the printer 1b via the interface unit 370.

The CPU 400 of the viewer 3 is equipped with the user interface unit 405, the data acquiring unit 410, the image processing unit 420, the display unit 430, and the printing unit 440 that exhibit the same respective functions as the user interface unit 105, the data acquiring unit 110, the image processing unit 120, the display unit 130, and the printing unit 140 (see FIG. 1) which are the function units of the CPU 100 of the first embodiment. Note that the printing unit 440 sends printing data to the printer 1b, and has printing performed on the printer 1b. Following, described is the process of steps S35 and S60 of FIG. 16 which are the main difference points from FIG. 3.

After the display image data is analyzed at step S30, the CPU 400 fetches the resolution (pixels/inch) when printing from the viewer 3 and the information of the printing paper type at step S35. These are consolidated to be called "printing information."

In specific terms, the CPU 400 makes a request for the resolution information for the "select and print" mode to the printer 1b via the interface unit 470. The CPU 100 of the printer 1b fetches that request via the interface unit 170. Then, the CPU 100 fetches the resolution and the printing paper type information for the "select and print" mode from the model data PTD within the ROM 160, and sends it to the viewer 3 via the interface unit 170. The CPU 400 fetches the printing information from the printer 1b via the interface unit 470, specifically, the resolution and printing paper type information. Note that the processing of this step S60 is performed by the image processing unit 420 as the function unit of the CPU 400.

At step S60, the display correction parameters are determined according to the printing information. For example, the smoothing radius as the display correction parameter is determined based on the resolution and printing paper type information fetched at step S35, the smoothing radius as the printing correction parameter determined at step S40, the pixel count Px1 of the printing image data, and the pixel count Px2 of the display image data. The processing of this step S60 is also performed by the image processing unit 420 as the function unit of the CPU 400.

At step S60, for example, the display correction parameters are determined according to the color of the printing paper. For example, "plain paper" is a color for which the printing paper color is yellowish compared to "photo paper." Also, "photo paper" is a color for which the color of the printing paper is more bluish than the "plain paper." Thus, when the printing paper type information fetched at step S35 is represented as "plain paper," the display correction parameters are determined so that the image will be a more yellowish image than with "photo paper." Then, when the printing paper type information is represented as "photo paper," the display correction parameters are determined so that the image will be a more bluish image than with the "plain paper."

By performing this kind of processing, after that, at step S80, it is possible to display on the display 370 an image closer to the impression received from the actual printing results.

Also, at step S60, when the resolution information fetched at step S35 is represented as high resolution, the display correction parameters are determined so that the edges of the display image are more accentuated than when represented as lower resolution. In more specific terms, the smoothing process radius is set larger.

In the first case when the printing resolution is high, it is easier to sense the printing image as being sharp. In contrast to this, in the second case when the printing resolution is lower than in the first case, it is more difficult to sense the sharpness of the printing image compared to the first case. Thus, by performing the kind of processing noted above, at step S80, it is possible to display on the display 370 an image closer to the impression received from the actual printing results. Note that typically, with the modes for which "plain paper" is used as the printing paper type, the resolution is lower than the modes that use "photo paper."

F. Sixth Embodiment

With the sixth embodiment, described is a printing system equipped with a display 7 that can display the image of the image data, the printer 1c that can print the image, and a personal computer connected to these.

Figure 17:
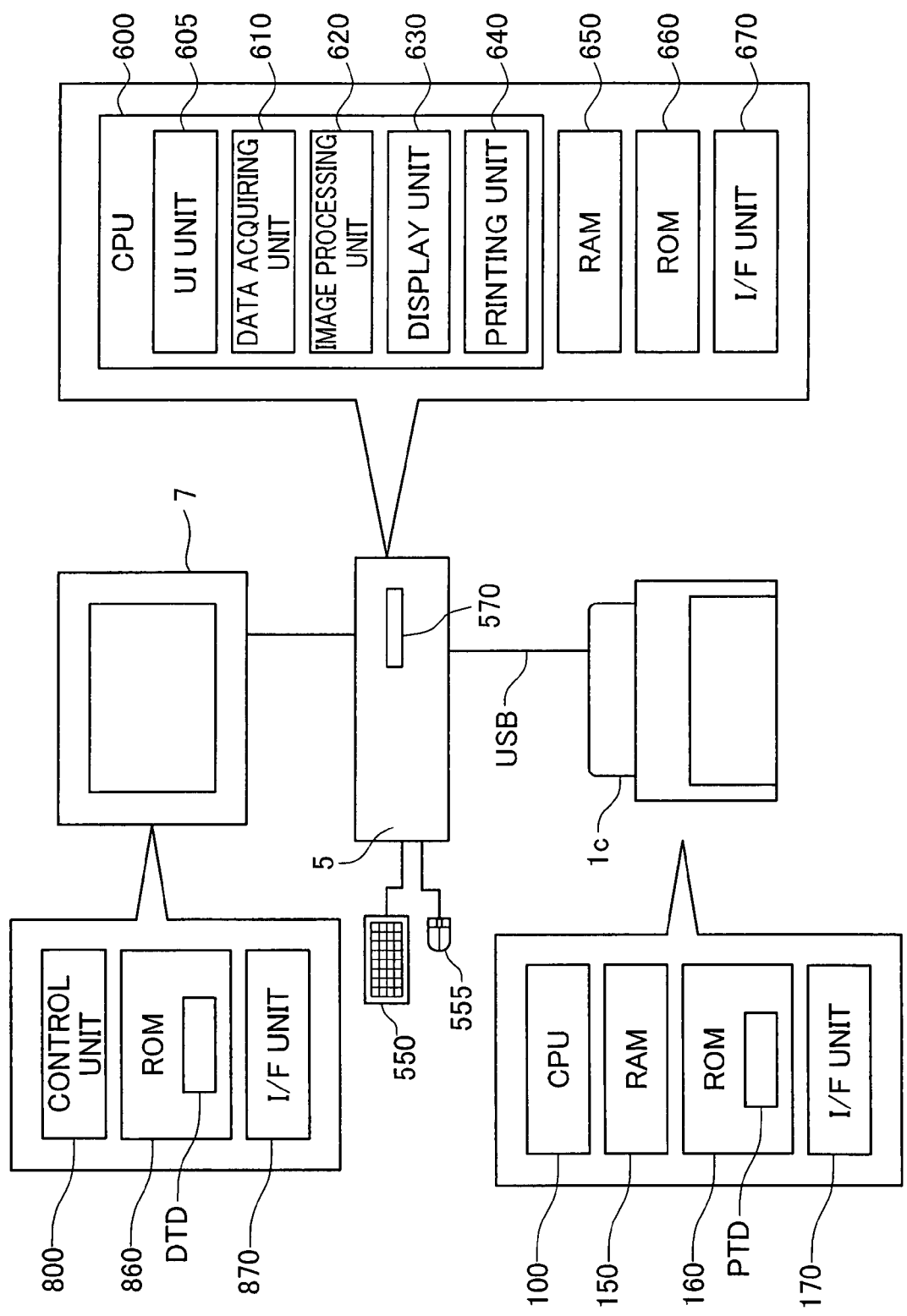
FIG. 17 shows the printing system equipped with the personal computer 5, the liquid crystal display 7, and the printer 1c which is an embodiment of the invention.

FIG. 17 shows a printing system equipped with the personal computer 5, the liquid crystal display 7 and the printer 1c as an embodiment of the invention. The personal computer 5 can display the image on the liquid crystal display 7 based on the image data file. Also, the personal computer 5 can perform printing of the image on the printer 1c based on the image data file.

The personal computer 5 is equipped with a keyboard 550 and a mouse 555 for the user to perform the various operations, an optical disk drive 570 for inserting a CD-ROM or DVD and reading data, a CPU 600, a main memory 650, a ROM 660, and an interface unit 670 for performing information exchange with the outside.

Note that in FIG. 17, the main memory 650 is noted as "RAM 650." Also, the interface unit 670 is noted as "I/F unit 670." Also, in FIG. 17, to make the description easier to understand, the CPU 600, the main memory 650, the ROM 660, and the interface unit 670 are displayed outside the personal computer 5.

The optical disk drive 570 can have a CD-ROM, CD-RW, or DVD inserted. The CPU 600 can fetch a plurality of image data files stored in recording media that were inserted in the optical disk drive 570.

The interface unit 670 performs data exchange between the printer 1c and the display 7. The printer 1c and the personal computer 5 are connected by a USB (Universal Serial Bus), for example. The connection between the display 7 and the personal computer 5 can be achieved according to specified standards for which information, as described later, can be transferred, as well as image data.

The printer 1c has the interface unit 170 for performing data exchange with the personal computer 5. The other constitution of the printer 1c is the same as the printer 1b of the fifth embodiment.

The liquid crystal display 7 has a control unit 800, a ROM 860, and an interface unit 870 for performing data exchange with the personal computer 5.

The liquid crystal display 7 stores the model data DTD in the ROM 860. The model data DTD includes the resolution (pixels/inch) information of the liquid crystal display 7. Note that the resolution differs according to the display model.

Figure 18:
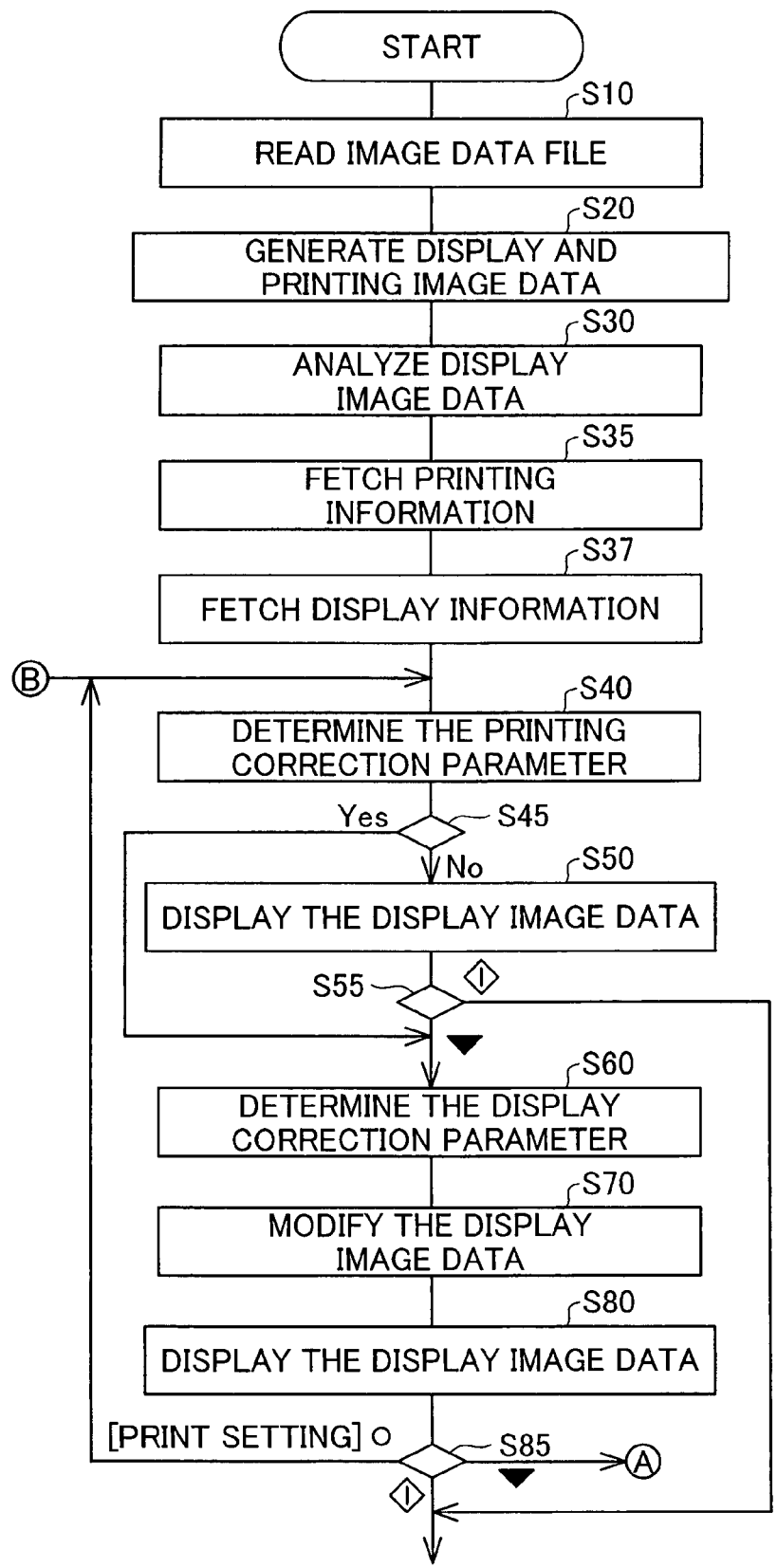
FIG. 18 is a flow chart showing the processing contents of the CPU 600 of the personal computer 5 for "select and print".

FIG. 18 is a flow chart showing the processing contents of the CPU 600 of the personal computer 5 with "select and print." The processing of FIG. 18 includes step S37. Then, the process of step S60 is performed reflecting the processing results of steps S35 and S37. The other points of the process of FIG. 18 are the same as the process of FIG. 16. Note that in FIG. 18, to have sufficiently large display of each step, the display of steps S87 and below (see FIG. 3) is omitted.

With the first embodiment, each process of FIG. 3 is executed by the CPU 100 of the printer 1 of the first embodiment. Then, with the fifth embodiment, each process of FIG. 16 is executed by the CPU 400 of the viewer 3. In contrast to these, with the sixth embodiment, each process of FIG. 18 is executed by the CPU 600 of the personal computer 5.

When performing each process of FIG. 18, the CPU 600 of the personal computer 5 performs data exchange with the printer 1c and the liquid crystal display 7 via the interface unit 670. Also, the CPU 600 displays a specified image on the liquid crystal display 7 when performing each process of FIG. 18 (see FIG. 2 and FIG. 4). The user input is received via the keyboard 550 and the mouse 555.

The CPU 600 of the personal computer 5 is equipped with the user interface unit 605, the data acquiring unit 610, the image processing unit 620, the display unit 630, and the printing unit 640 that exhibit the same respective functions as the user interface unit 105, the data acquiring unit 110, the image processing unit 120, the display unit 130, and the printing unit 140 (see FIG. 1) which are the function units of the CPU 100 of the first embodiment. Note that the printing unit 640 sends printing data to the printer 1c, and has printing performed on the printer 1c. Then, the display unit 630 sends image data to the liquid crystal display 7 and has images displayed on the liquid crystal display 7. Following, described are the processes of the steps S37 and S60 of FIG. 18 which are the main difference points from FIG. 16.

After fetching the printing information at step S35, the CPU 600 fetches the resolution (pixels/inch) information from the display 7 at step S37. This information is called "display information."

In specific terms, the CPU 600 makes a request for resolution information to the display 7 via the interface unit 670. The control unit 800 of the display unit 7 receives the request via the interface unit 870. Then, the control unit 800 fetches resolution information from the model data DTD within the ROM 860, and sends it to the personal computer 5 via the interface unit 870. The CPU 600 receives the display information from the display 7 via the interface unit 870, specifically, the display resolution information.

At step S60, the display correction parameters are determined according to the printing information fetched at step S35 and the display information fetched at step S37. For example, the smoothing radius as the display correction parameter is determined based on the resolution and printing paper type information fetched at step S35, the resolution information fetched at step S37, the smoothing radius as the printing correction parameter determined at step S40, the pixel count Px1 of the printing image data, and the pixel count Px2 of the display image data.

At step S60, for example, the display correction parameter is determined according to the ratio of the resolution Dp of the printer 1c and the resolution Dd of the display. For example, when Dp/Dd is large, the display correction parameter is determined so that the edge of the display image is more accentuated than when the Dp/Dd is smaller. In more specific terms, the smoothing process radius is set to be larger.

In the first case when Dp/Dd is large, it is easier to sense the sharpness of the printing image than with a display image on the display. In contrast to this, in the second case when Dp/Dd is smaller than the first case, it is more difficult to sense the sharpness with the printing image compared to the first case. Thus, by performing the kind of process noted above, it is possible to display on the display 370 an image closer to the impression received from the actual printing results at step S80.

G. Variation Examples

Note that this invention is not limited to the aforementioned embodiments as aspects, and it is possible to implement various aspects in a scope that does not stray from the key points, for example the following variations are possible.

G1. Variation Example 1

With the embodiments noted above, the pixel count Px1 of the printing image data and the pixel count Px2 of the display image data were the horizontal direction pixel counts of the respective images. However, the pixel count Px1 of the printing image data and the pixel count Px2 of the display image data can also be the vertical direction pixel counts of the respective images. Also, the pixel count Px1 of the printing image data and the pixel count Px2 of the display image data can be the number of pixels aligned on the diagonal line of the respective images. Specifically, the pixel count Px1 of the printing image data and the pixel count Px2 of the display image data can be the pixel counts representing the size of the respective images.

G2. Variation Example 2

Note that with the embodiments noted above, the parameter ratio coefficients Cr, Ct, Cca, and Ccx in relation to the ratio Px2/Px1 of the image data pixel counts were values in a range from 0.5 to 2.0 (see formulas (4), (8), (10), and (12)). However, it is also possible to use other values for the parameter ratio coefficients in relation to the ratio Px2/Px1 of the image data pixel counts. Specifically, the value of the ratio of image processing parameter in relation to the display image data and the image processing parameter in relation to the printing image data can be made to be a value within a specified range containing the image data pixel count ratio Px2/Px1. Note that the parameter ratio coefficient in relation to the pixel data pixel count ratio Px2/Px1 is more preferably 0.75 to 2.0, and even more preferably 1.0 to 2.0.

G3. Variation Example 3

With the embodiments noted above, the analysis at step S30 of FIG. 3 is performed based on the display image data. However, the analysis at step S30 of FIG. 3 can also be performed based on printing image data or on image data fetched at step S10. Furthermore, it can also be performed based on image data generated for displaying thumbnails. Specifically, the analysis for determining the image type can be performed based on fetched image data or on data generated from that image data.

G4. Variation Example 4

With the embodiments noted above, the image processing parameter in relation to the display image data is determined so that the value of the ratio of the image processing parameter in relation to the display image data and the image processing parameter in relation to the printing image data are contained in a specified range containing the image data pixel count ratio Px2/Px1. However, it is also possible to determine the image processing parameter in relation to the display image data based on the display image resolution Rs2 and the printing image resolution Rs1.

For example, it is preferable for the image processing parameter in relation to the display image data to have the value of the ratio of the image processing parameter in relation to the display image data and the image processing parameter in relation to the printing image data be determined so as to be contained in a specified range that contains the ratio (Rs2/Rs1) of the display image resolution Rs2 and the printing image resolution Rs1. With that kind of aspect, in addition to the image data pixel count, it is also possible to determine the image processing parameter in relation to the display image data based on the dimensions of the printed image and the image displayed on the display unit.

G5. Variation Example 5

With the fourth embodiment noted above, the size of the eyes is enlarged only in the vertical direction. However, it is also possible to have an aspect whereby the size of the eyes is also enlarged in the horizontal direction. With that kind of aspect, it is possible to calculate the pixel value of pixels other than the eye based on the pixel value of pixels aligned along the perpendicular direction of the center line in the eye left-right direction.

G6. Variation Example 6

With the embodiments noted above, the CPU 100 automatically determined the display correction parameters. Also, the printing correction parameters were selected by the user from among the choices essentially prepared in advance. However, it is also possible to have an aspect whereby the user directly inputs the parameter value via an input means such as the liquid crystal display 40 or the like, or corrects the parameter value determined by the CPU 100. With that kind of aspect, the image processing parameters in relation to the display image data and the image processing parameters in relation to the printing image parameters are determined according to instructions from the user. Note that the instructions relating to the parameters are received via the user interface unit 105 which is the function unit of the CPU 100.

It is also possible to use an aspect that performs printing by determining the image processing contents automatically by the CPU 100 without receiving instructions from the user. In that kind of case, input from the user is not performed at step S40 of FIG. 3.

G7. Variation Example 7

With the fifth embodiment noted above, described was the viewer 3 that performs printing using the printer 1b (see FIG. 15). However, an aspect of the invention is that it can be applied to any other equipment such as a digital still camera, mobile phone, PDA (Personal Digital Assistant), or display integrated personal computer or the like. Note that the equipment to which the invention is applied is preferably equipment that is equipped with an image display unit for displaying images, and that can have image output performed using another output device such as a printer or projector or the like.

G8. Variation Example 8

With the first to fourth embodiments noted above, a description was given of aspects of this invention using, as an example, an integrated printer equipped with the liquid crystal display 40 and the card slot 70 (see FIG. 1). Then, with the fifth embodiment noted above, described was an example of a viewer 3 that can perform printing using the printer 1b (see FIG. 15). However, an aspect of the invention is that, as with the sixth embodiment, for example, it can also be constituted as a printing system containing a display (display device), a printer (printing device), a card reader that can read image data from a memory card (image data fetching device), and a computer connected to these.

With that kind of system, it is preferable to perform the following kind of process. Specifically, the display image data and the printing image data are generated based on the image data fetched via the card reader. The printing image data is generated according to the pixel count Px1 of the pixels for which printing is executed using the printer. The display image data is generated according to the pixel count Px2 of the image displayed on the display device.

Then, the image processing performed based on the positional relationship between pixels in the image is performed on the printing image data according to the first parameter P1. Also, the same image processing is performed on the display image data according to the second parameter P2. Note that before performing image processing on the display image data, the second parameter P2 is determined based on the first parameter P1, the printing pixel count Px1 which is the pixel count of the printing image data, and the display pixel count Px2 which is the pixel count of the display image data.

Note that with the aspects noted above, when it is possible to change the size of the image (pixel count) displayed on the display device, or when it is possible to select from among a plurality of types, the display image data and the second parameter are preferably generated according to the pixel count set in that way.

Note that it is possible to realize various aspects with this invention, but it is more preferable to apply the invention to aspects for which the pixel count of the display unit that displays the images (for example, the horizontal direction pixel count when displaying images) and the pixel count when performing printing (for example, the horizontal direction pixel count when printing images) are different. Then, it is even more preferable to apply it to aspects for which the pixel count of the display unit for displaying images is smaller than the pixel count when performing printing. Note that the "pixel count" of the display unit and the "pixel count" when performing printing can also be determined by another method. For example, it is possible to use the vertical direction pixel count when displaying an image or when printing.

G9. Variation Example 9

With the embodiments noted above, it is possible to make it so that part of the constitution realized using hardware can be replaced with software, and conversely, part of the constitution realized using software can be replaced using hardware. For example, part of the CPU functions can be executed using hardware circuits.

A computer program that realizes this kind of function is provided in a format recorded on a computer readable recording medium such as a floppy disk, a CD-ROM, a DVD or the like. The host computer reads the computer program from that recording medium and transfers it to an internal storage device or an external storage device. Alternatively, it is also possible to provide the computer program to the host computer from a program supply device via a communication path. When realizing the functions of the computer program, the computer program stored in the internal storage device is executed by the microprocessor of the host computer. It is also possible to have the host computer directly execute the computer program recorded on the recording medium.

With this specification, a computer is a concept including the hardware device and operating system, and means the hardware device that operates under the control of the operating system. The computer program realizes the functions of each of the units described above on this kind of computer. Note that part of the function described above can also be realized by the operating system rather than the application program.

Note that with this specification, the "computer readable recording medium" is not limited to a portable recording medium such as a flexible disk or CD-ROM, but also includes internal storage devices in a computer such as various types of RAM, ROM or the like, and external storage devices fixed to the computer such as a hard disk or the like.

The Program product may be realized as many aspects. For example:

(i) Computer readable medium, for example the flexible disks, the optical disk, or the semiconductor memories;
(ii) Data signals, which comprise a computer program and are embodied inside a carrier wave;
(iii) Computer including the computer readable medium, for example the magnetic disks or the semiconductor memories; and
(iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A printing device comprising:
a data acquiring unit configured to acquire image data;
an image processing unit configured to generate display image data and printing image data based on the image data by
with pixel value of a pixel at a first position in an image of the printing image data, performing an image process of modifying a pixel value of a first subject pixel of the printing image data at the first position or another position, the first position being determined according to a first parameter P1,
with pixel value of a pixel at a second position in an image of the display image data, performing an image process of modifying a pixel value of a second subject pixel of the display image data at the second position or another position, the second position being determined according to a second parameter P2, and
determining the second parameter P2 such that a ratio (P2/P1) of the second parameter P2 and the first parameter P1 is in a specified range that includes a ratio (Px2/Px1) of a display pixel count Px2 representing a size of the image of the display image data and a printing pixel count Px1 representing a size of the image of the printing image data;
a display unit configured to display an image based on the display image data; and
a printing unit configured to perform printing based on the printing image data, wherein
the first position is a first relative position relative to the first subject pixel,
the second position is a second relative position relative to the second subject pixel,
the image processing unit:
modifies the pixel value of the first subject pixel using pixel values of one or more pixels in the first relative position relative to the first subject pixel, and
modifies the pixel value of the second subject pixel using pixel values of one or more pixels in the second relative position relative to the second subject pixel, and
the image processing unit:
determines a type of an image of the image data from among a plurality of types of images including a first type of image and a second type of image which includes clear contours more than the first type of image, and determines the second parameter P2 such that when the image of the image data is the second type of image, (P2/P1) is smaller than when the image of the image data is the first type of image.

2. A printing device in accordance with claim 1, wherein the image processing unit further determines the second parameter P2 based on a size of the image to be printed.

3. A printing device in accordance with claim 1, further comprising an input unit configured to receive input of instruction relating to the first parameter P1 from a user, wherein the image processing unit determines the first and second parameters P1 and P2 according to the instructions from the user.

4. A method of performing printing based on image data, comprising:

acquiring image data;

generating display image data and printing image data based on the image data;

displaying an image based on the display image data; and performing printing based on the printing image data, wherein the generating display image data and printing image data includes:

with pixel value of a pixel at a first position in an image of the printing image data, performing an image process of modifying a pixel value of a first subject pixel of the printing image data at the first position or another position, the first position being determined according to a first parameter P1;

with pixel value of a pixel at a second position in an image of the display image data, performing an image process of modifying a pixel value of a second subject pixel of the display image data at the second position or another position, the second position being determined according to a second parameter P2; and before the image process of modifying the pixel value of the second subject pixel, determining the second parameter P2 such that a ratio (P2/P1) of the second parameter P2 and the first parameter P1 is in a specified range that includes a ratio (Px2/Px1) of a display pixel count Px2 representing a size of the image of the display image data and a printing pixel count Px1 representing a size of the image of the printing image data, wherein the first position is a first relative position relative to the first subject pixel, the second position is a second relative position relative to the second subject pixel, the generating display image data and printing image data includes:

modifying the pixel value of the first subject pixel using pixel values of one or more pixels in the first relative position relative to the first subject pixel, and modifying the pixel value of the second subject pixel using pixel values of one or more pixels in the second relative position relative to the second subject pixel, and the generating display image data and printing image data includes:

determining a type of an image of the image data from among a plurality of types of images including a first type of image and a second type of image which includes clear contours more than the first type of image, and determining the second parameter P2 such that when the image of the image data is the second type of image, (P2/P1) is smaller than when the image of the image data is the first type of image.

5. A computer program product for printing based on image data, the computer program product comprising:

a computer readable storage medium; and a computer program stored on the computer readable storage medium, the computer program comprising:

a module for acquiring image data;

a module for generating display image data and printing image data based on the image data;

a module for displaying an image based on the display image data; and a module for performing printing based on the printing image data, wherein the module for generating display image data and printing image data includes:

a module for, with pixel value of a pixel at a first position in an image of the printing image data, performing an image process of modifying a pixel value of a first subject pixel of the printing image data at the first position or another position, the first position being determined according to a first parameter P1;

a module for, with pixel value of a pixel at a second position in an image of the display image data, performing an image process of modifying a pixel value of a second subject pixel of the display image data at the second position or another position, the second position being determined according to a second parameter P2; and a module for, before the image process of modifying the pixel value of the second subject pixel, determining the second parameter P2 such that a ratio (P2/P1) of the second parameter P2 and the first parameter P1 is in a specified range that includes a ratio (Px2/Px1) of a display pixel count Px2 representing a size of the image of the display image data and a printing pixel count Px1 representing a size of the image of the printing image data, the first position is a first relative position relative to the first subject pixel, the second position is a second relative position relative to the second subject pixel, the module for generating display image data and printing image data includes:

a module for modifying the pixel value of the first subject pixel using pixel values of one or more pixels in the first relative position relative to the first subject pixel, and a module for modifying the pixel value of the second subject pixel using pixel values of one or more pixels in the second relative position relative to the second subject pixel, and the module for generating display image data and printing image data includes:

a module for determining a type of an image of the image data from among a plurality of types of images including a first type of image and a second type of image which includes clear contours more than the first type of image, and a module for determining the second parameter P2 such that when the image of the image data is the second type of image, (P2/P1) is smaller than when the image of the image data is the first type of image.

* * * * *